United States Patent
Mastellone et al.

(10) Patent No.: US 11,971,085 B2
(45) Date of Patent: Apr. 30, 2024

(54) GEARBOX ASSEMBLY

(71) Applicants: GE Avio S.r.l., Rivalta di Torino (IT);
GE Aviation Czech s.r.o., Prague (CZ)

(72) Inventors: Paolo Mastellone, Cuneo (IT);
Leonardo Coviello, Bari (IT); Juraj Hrubec, Prague (CZ)

(73) Assignees: GE AVIO S.R.L., Rivalta di Torino (IT); GE AVIATION CZECH S.R.O., Prague (CZ)

( * ) Notice: Subject to any disclaimer, the term of this patent is extended or adjusted under 35 U.S.C. 154(b) by 0 days.

(21) Appl. No.: 18/156,526

(22) Filed: Jan. 19, 2023

(65) Prior Publication Data
US 2024/0026955 A1    Jan. 25, 2024

(30) Foreign Application Priority Data
Jul. 22, 2022  (IT) .......... 102022000015483

(51) Int. Cl.
| | | |
|---|---|---|
| F16H 1/28 | (2006.01) | |
| F02C 7/36 | (2006.01) | |
| F16H 57/08 | (2006.01) | |
| F16H 57/02 | (2012.01) | |

(52) U.S. Cl.
CPC .......... *F16H 1/28* (2013.01); *F02C 7/36* (2013.01); *F16H 57/08* (2013.01); *F05D 2260/40311* (2013.01); *F16H 2057/02039* (2013.01); *F16H 2057/085* (2013.01)

(58) Field of Classification Search
CPC .................... F16D 1/28; F16D 57/08
See application file for complete search history.

(56) References Cited

U.S. PATENT DOCUMENTS

| | | |
|---|---|---|
| 5,102,379 A | 4/1992 | Pagluica et al. |
| 8,690,721 B2 | 4/2014 | McCune |
| 10,907,579 B2 | 2/2021 | McCune et al. |
| 11,174,916 B2 | 11/2021 | Desjardins |
| 11,268,453 B1 | 3/2022 | Desjardins et al. |
| 2011/0299974 A1 | 12/2011 | Gauthier et al. |
| 2021/0388770 A1 | 12/2021 | Hrubec et al. |

FOREIGN PATENT DOCUMENTS

| | | |
|---|---|---|
| EP | 1435475 A2 | 7/2004 |
| EP | 2270361 A2 | 1/2011 |
| EP | 3361122 A1 | 8/2018 |
| EP | 3628894 A1 | 4/2020 |
| EP | 3726031 A1 | 10/2020 |

(Continued)

*Primary Examiner* — Justin D Seabe
*Assistant Examiner* — John S Hunter, Jr.
(74) *Attorney, Agent, or Firm* — Venable LLP; Peter T. Hrubiec; Michele V. Frank

(57) ABSTRACT

A gearbox assembly includes a plurality of planet gears. At least one planet gear of the plurality of planet gears includes a layshaft that supports a first stage planet gear and a second stage planet gear. The at least one planet gear is characterized by a Radial Stage Distance greater than or equal to 30 millimeters and less than or equal to 100 millimeters. The Radial Stage Distance is $R_{rm1}-R_{rt2}$. $R_{rm1}$ is a first stage rim inner radius of the first stage planet gear and $R_{rt2}$ is a second stage root radius of the second stage planet gear.

20 Claims, 13 Drawing Sheets

(56) References Cited

FOREIGN PATENT DOCUMENTS

| | | |
|---|---|---|
| FR | 2987402 A1 | 8/2013 |
| FR | 2987416 A1 | 8/2013 |
| FR | 3041054 A1 | 3/2017 |
| FR | 3127024 A1 | 3/2023 |
| FR | 3127025 A1 | 3/2023 |
| FR | 3129436 A1 | 5/2023 |
| FR | 3129690 A1 | 6/2023 |
| FR | 3130747 A1 | 6/2023 |
| FR | 3130875 A1 | 6/2023 |

GEARBOX ASSEMBLY

GOVERNMENT SPONSORED RESEARCH

The project leading to this application has received funding from the Clean Sky 2 Joint Undertaking (JU) under grant agreement No. 945541. The JU receives support from the European Union's Horizon 2020 research and innovation program and the Clean Sky 2 JU members other than the Union.

CROSS REFERENCE TO RELATED APPLICATIONS

The present application claims the benefit of Italian Patent Application No. 102022000015483, filed on Jul. 22, 2022, which is hereby incorporated by reference herein in its entirety.

TECHNICAL FIELD

The present disclosure relates generally to gearbox assemblies for turbine engines.

BACKGROUND

A turbine engine generally includes a fan and a core section arranged in flow communication with one another. A gearbox assembly is coupled between the fan and the core section.

BRIEF DESCRIPTION OF THE DRAWINGS

The foregoing and other features and advantages will be apparent from the following, more particular, description of various exemplary embodiments, as illustrated in the accompanying drawings, wherein like reference numbers generally indicate identical, functionally similar, and/or structurally similar elements.

DETAILED DESCRIPTION

Figure 1:
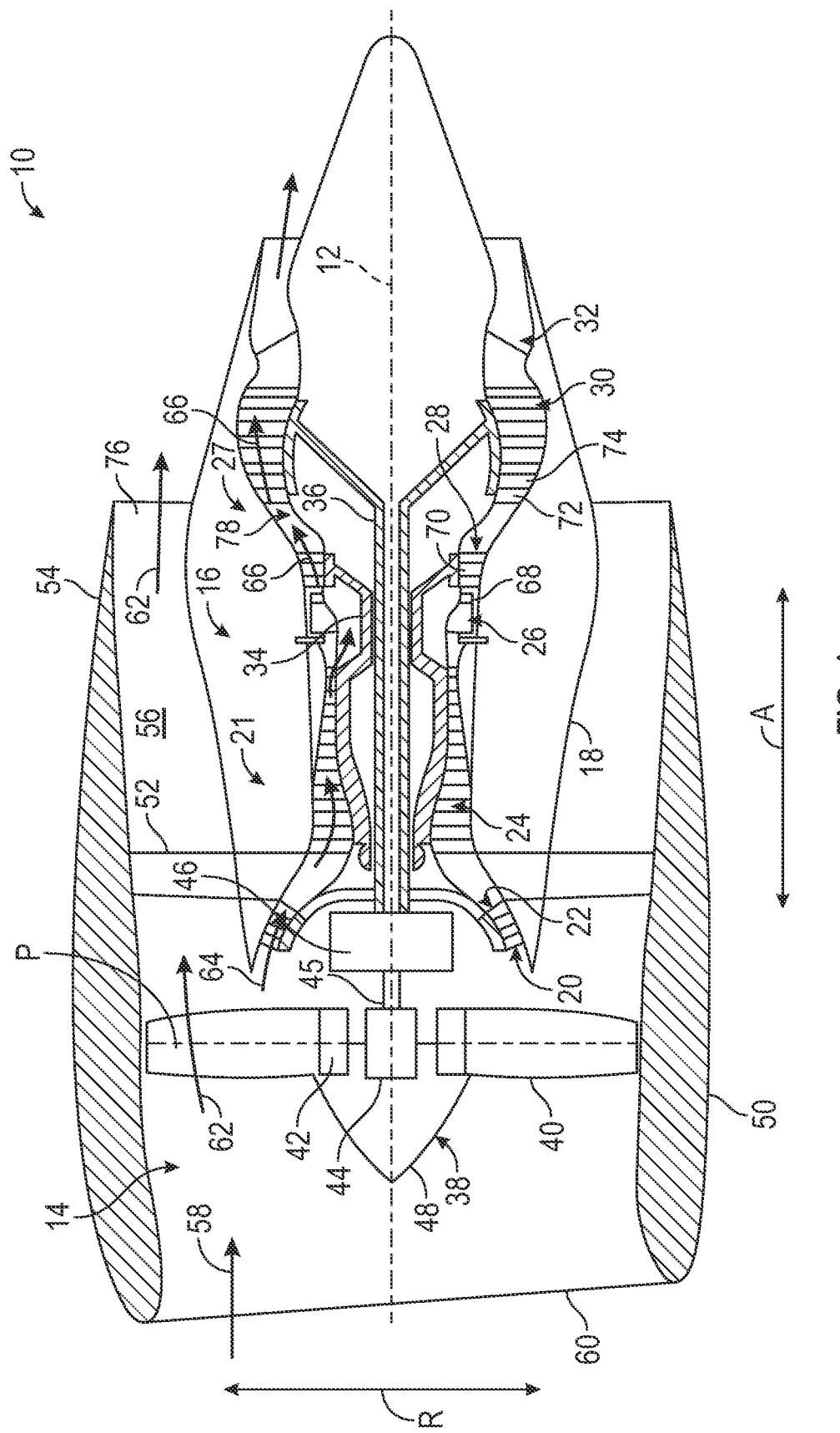
FIG. 1 is a schematic cross-sectional diagram of a turbine engine, taken along a centerline axis of the turbine engine, according to an embodiment of the present disclosure.

Additional features, advantages, and embodiments of the present disclosure are set forth or apparent from a consideration of the following detailed description, drawings, and claims. Moreover, both the foregoing summary of the present disclosure and the following detailed description are exemplary and intended to provide further explanation without limiting the scope of the disclosure as claimed.

Various embodiments of the present disclosure are discussed in detail below. While specific embodiments are discussed, this is done for illustration purposes only. A person skilled in the relevant art will recognize that other components and configurations may be used without departing from the spirit and the scope of the present disclosure.

As used herein, the terms "first," "second," and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached," "connected," and the like, refer to both direct coupling, fixing, attaching, or connecting, as well as indirect coupling, fixing, attaching, or connecting through one or more intermediate components or features, unless otherwise specified herein.

The singular forms "a," "an," and "the" include plural references unless the context clearly dictates otherwise.

As used herein, the terms "axial" and "axially" refer to directions and orientations that extend substantially parallel to a centerline of the turbine engine. Moreover, the terms "radial" and "radially" refer to directions and orientations that extend substantially perpendicular to the centerline of the turbine engine. In addition, as used herein, the terms "circumferential" and "circumferentially" refer to directions and orientations that extend arcuately about the centerline of the turbine engine.

As used herein, "tubular" means a longitudinally extending structure that has a hollow interior section.

Here and throughout the specification and claims, range limitations are combined, and interchanged. Such ranges are identified and include all the sub-ranges contained therein unless context or language indicates otherwise. For example, all ranges disclosed herein are inclusive of the endpoints, and the endpoints are independently combinable with each other.

A turbine engine can be configured as a geared engine. Geared engines include a power gearbox utilized to transfer power from a turbine shaft to a main fan. Such gearboxes may include a sun gear, a plurality of planet gears, and a ring gear. The sun gear meshes with the plurality of planet gears and the plurality of planet gears mesh with the ring gear. In operation, the gearbox transfers the torque transmitted from the turbine shaft operating at a first speed to a fan shaft rotating at a second, lower speed. For a planet configuration of the gearbox, the sun gear may be coupled to the mid-shaft of a lower pressure turbine rotating at the first speed. The plurality of planet gears, intermeshed with the sun gear, then transfer this torque to the fan shaft through a planet carrier. In a star configuration, the ring gear is coupled to the fan shaft. In either configuration, the plurality of planet gears may include compound gears such that the plurality of planet gears each include a first stage and a second stage. The first stage is meshed with the sun gear and the second stage is meshed with the ring gear.

A key component of turbine engine design is minimizing overall weight of the turbine engine while increasing engine efficiency of the turbine engine. One way to minimize overall weight of the turbine engine is to minimize the weight of the power gearbox by making the power gearbox smaller. During manufacturing of the planet gears, a grinding wheel is typically used to remove material from the gear teeth of the planet gears to form a final profile of the gear teeth. For example, the grinding wheel is used to form the gear teeth of the first stage of the planet gears and the gear teeth of the second stage of the planet gears. Current planet gear designs, however, do not need to account for a size of the grinding wheels when designing a size of the planet gear. The inventors, seeking a need to improve upon the existing planet gears for power gearboxes, designed several different configurations of the planet gears in an effort to improve upon the efficiency, weight and size of a power gearbox.

Referring now to the drawings, FIG. 1 is a schematic cross-sectional diagram of a turbine engine 10, taken along a centerline axis of the turbine engine 10, according to an embodiment of the present disclosure. As shown in FIG. 1, the turbine engine 10 defines an axial direction A (extending parallel to a longitudinal, centerline axis 12 provided for reference) and a radial direction R that is normal to the axial direction A. In general, the turbine engine 10 includes a fan section 14 and a core turbine engine 16 disposed downstream from the fan section 14.

The core turbine engine 16 depicted generally includes an outer casing 18 that is substantially tubular and defines an annular inlet 20. As schematically shown in FIG. 1, the outer casing 18 encases, in serial flow relationship, a compressor section 21 including a booster or a low pressure (LP) compressor 22 followed downstream by a high pressure (HP) compressor 24, a combustion section 26, a turbine section 27 including a high pressure (HP) turbine 28 followed downstream by a low pressure (LP) turbine 30, and a jet exhaust nozzle section 32. A high pressure (HP) shaft 34 or spool drivingly connects the HP turbine 28 to the HP compressor 24 to rotate the HP turbine 28 and the HP compressor in unison. A low pressure (LP) shaft 36 drivingly connects the LP turbine 30 to the LP compressor 22 to rotate the LP turbine 30 and the LP compressor 22 in unison. The compressor section 21, the combustion section 26, the turbine section 27, and the jet exhaust nozzle section 32 together define a core air flowpath.

For the embodiment depicted in FIG. 1, the fan section 14 includes a fan 38 (e.g., a variable pitch fan) having a plurality of fan blades 40 coupled to a disk 42 in a spaced apart manner. As depicted in FIG. 1, the fan blades 40 extend outwardly from the disk 42 generally along the radial direction R. Each fan blade 40 is rotatable relative to the disk 42 about a pitch axis P by virtue of the fan blades 40 being operatively coupled to an actuation member 44 configured to collectively vary the pitch of the fan blades 40 in unison. The fan blades 40, the disk 42, and the actuation member 44 are together rotatable about the centerline axis 12 via a fan shaft 45 that is powered by the LP shaft 36 across a power gearbox 46, also referred to as a gearbox assembly 46. The gearbox assembly 46 is shown schematically in FIG. 1. The gearbox assembly 46 includes a plurality of gears for adjusting the rotational speed of the fan shaft 45 and, thus, the fan 38 relative to the LP shaft 36 to a more efficient rotational fan speed.

Referring still to the exemplary embodiment of FIG. 1, the disk 42 is covered by a rotatable fan hub 48 aerodynamically contoured to promote an airflow through the plurality of fan blades 40. In addition, the fan section 14 includes an annular fan casing or a nacelle 50 that circumferentially surrounds the fan 38 and/or at least a portion of the core turbine engine 16. The nacelle 50 is supported relative to the core turbine engine 16 by a plurality of circumferentially spaced outlet guide vanes 52. Moreover, a downstream section 54 of the nacelle 50 extends over an outer portion of the core turbine engine 16 to define a bypass airflow passage 56 therebetween.

During operation of the turbine engine 10, a volume of air 58 enters the turbine engine 10 through an inlet 60 of the nacelle 50 and/or the fan section 14. As the volume of air 58 passes across the fan blades 40, a first portion of air 62 is directed or routed into the bypass airflow passage 56, and a second portion of air 64 is directed or is routed into the upstream section of the core air flowpath, or, more specifically, into the annular inlet 20 of the LP compressor 22. The ratio between the first portion of air 62 and the second portion of air 64 is commonly known as a bypass ratio. The pressure of the second portion of air 64 is then increased as it is routed through the HP compressor 24 and into the combustion section 26, where the highly pressurized air is mixed with fuel and burned to provide combustion gases 66.

The combustion gases 66 are routed into the HP turbine 28 and expanded through the HP turbine 28 where a portion of thermal and/or of kinetic energy from the combustion gases 66 is extracted via sequential stages of HP turbine stator vanes 68 that are coupled to the outer casing 18 and HP turbine rotor blades 70 that are coupled to the HP shaft 34, thus, causing the HP shaft 34 to rotate, thereby supporting operation of the HP compressor 24. The combustion gases 66 are then routed into the LP turbine 30 and expanded through the LP turbine 30. Here, a second portion of thermal and kinetic energy is extracted from the combustion gases 66 via sequential stages of LP turbine stator vanes 72 that are coupled to the outer casing 18 and LP turbine rotor blades 74 that are coupled to the LP shaft 36, thus, causing the LP shaft 36 to rotate. This thereby supports operation of the LP compressor 22 and rotation of the fan 38 via the gearbox assembly 46.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before being exhausted from a fan nozzle exhaust section 76 of the turbine engine 10, also providing propulsive thrust. The HP turbine 28, the LP turbine 30, and the jet exhaust nozzle section 32 at least partially define a hot gas path 78 for routing the combustion gases 66 through the core turbine engine 16.

The turbine engine 10 depicted in FIG. 1 is by way of example only. In other exemplary embodiments, the turbine engine 10 may have any other suitable configuration. For example, in other exemplary embodiments, the fan 38 may be configured in any other suitable manner (e.g., as a fixed pitch fan) and further may be supported using any other suitable fan frame configuration. Moreover, in other exemplary embodiments, any other suitable number or configuration of compressors, turbines, shafts, or a combination thereof may be provided. In still other exemplary embodiments, aspects of the present disclosure may be incorporated into any other suitable gas turbine engine, such as, for example, turbofan engines, propfan engines, turbojet engines, and/or turboshaft engines.

Figure 2:
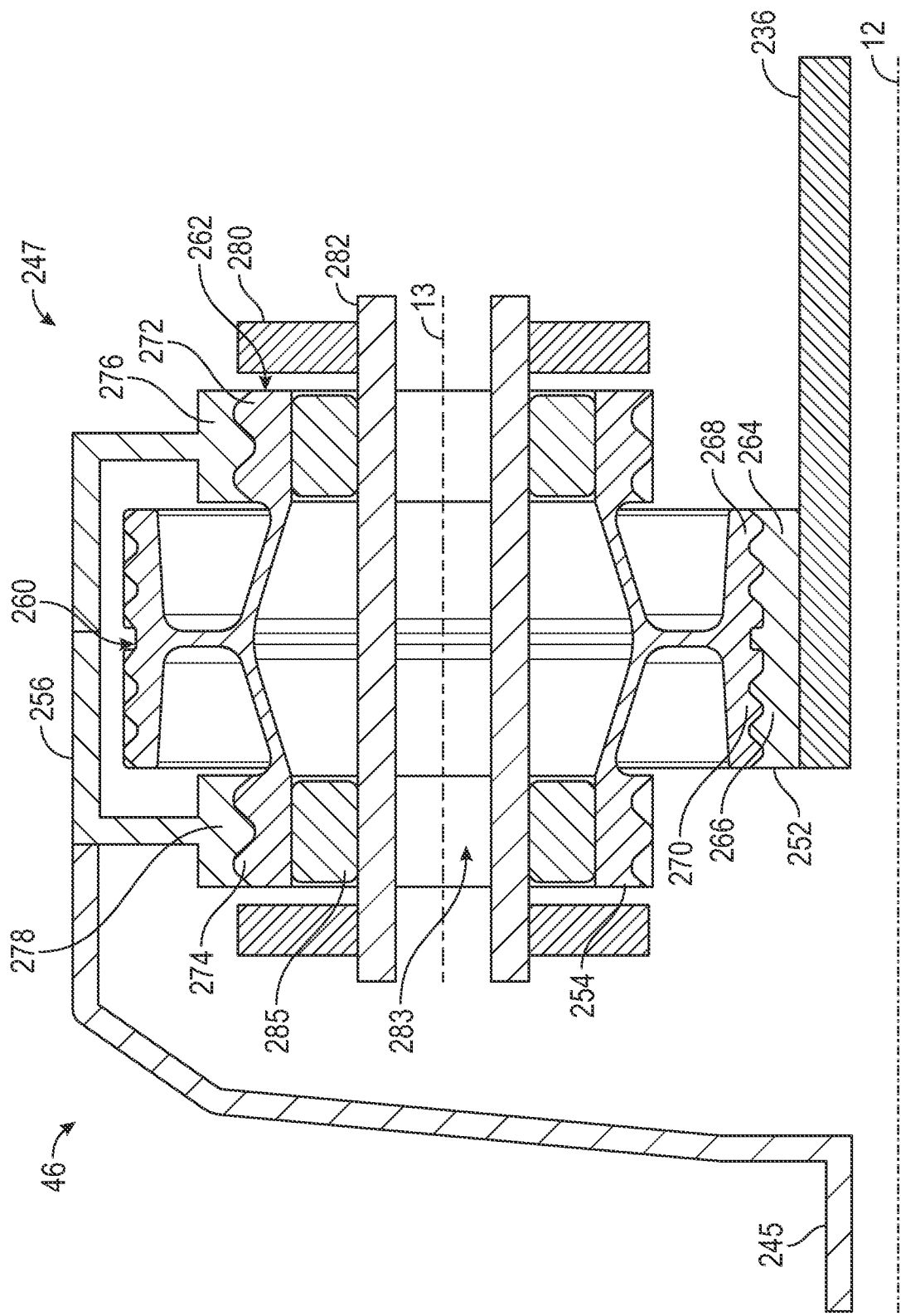
FIG. 2 is a schematic, cross-sectional side view of a gearbox assembly for a turbine engine, taken along a centerline axis of the turbine engine, according to an embodiment of the present disclosure.

FIG. 2 is a schematic, cross-sectional side view of the gearbox assembly 46, according to an embodiment of the present disclosure. The gearbox assembly 46 includes an epicyclic gear assembly 247 in a compound symmetrical arrangement. The epicyclic gear assembly 247 includes a sun gear 252, a plurality of planet gears 254 (only one of which is visible in FIG. 2), and a ring gear 256. For clarity, only a portion of the gears is shown. The gearbox assembly 46 is a star type or a rotating ring gear type gearbox assembly (e.g., the ring gear 256 is rotating and a planet carrier 280 is fixed and stationary). In such an arrangement, the fan 38 (FIG. 1) is driven by the ring gear 256. In this way, the ring gear 256 is an output of the gearbox assembly 46. However, other suitable types of gearbox assemblies may be employed. In one non-limiting embodiment, the gearbox assembly 46 may be a planetary arrangement, in which the ring gear 256 is held fixed, with the planet carrier 280 allowed to rotate. In such an arrangement, the fan 38 is driven by the planet carrier 280. In this way, the plurality of planet gears 254 are the output of the gearbox assembly 46. In another non-limiting embodiment, the gearbox assembly 46 may be a differential gearbox in which the ring gear 256 and the planet carrier 280 are both allowed to rotate.

An input shaft 236 is coupled to the sun gear 252. The input shaft 236 is coupled to the turbine section 27 (FIG. 1). For example, the input shaft 236 can be coupled to the LP shaft 36 (FIG. 1). Radially outward of the sun gear 252, and intermeshing therewith, is the plurality of planet gears 254 that are coupled together and supported by the planet carrier 280. The planet carrier 280 supports and constrains the plurality of planet gears 254 such that the plurality of planet gears 254 do not together rotate around the sun gear 252 while enabling each planet gear of the plurality of planet gears 254 to rotate about its own axis 13. Radially outwardly of the plurality of planet gears 254, and intermeshing therewith, is the ring gear 256, which is an annular ring gear. FIG. 2 shows the ring gear 256 is formed of two separate components that are coupled together. In some embodiments, the ring gear 256 may be a single unitary component. The ring gear 256 is coupled via an output shaft 245 to the fan 38 (FIG. 1) and rotates to drive rotation of the fan 38 (FIG. 1) about the centerline axis 12. For example, the output shaft 245 is coupled to the fan shaft 45 (FIG. 1).

Each of the plurality of planet gears 254 is a compound gear that includes a first stage planet gear 260 and a second stage planet gear 262 coupled together. As detailed further below, the first stage planet gear 260 includes a greater diameter than a diameter of the second stage planet gear 262. Each of the sun gear 252, the plurality of planet gears 254, and the ring gear 256 comprises teeth about their periphery to intermesh with the other gears. For example, each of the sun gear 252, the plurality of planet gears 254, and the ring gear 256 are double helical gears with first and second sets of helical teeth that are inclined at an acute angle relative to each other. In particular, the sun gear 252 comprises a first set of sun gear teeth 264 and a second set of sun gear teeth 266. Each of the first stage planet gears 260 includes a first set of planet gear teeth 268 and a second set of planet gear teeth 270, and each of the second stage planet gears 262 includes a third set of planet gear teeth 272 and a fourth set of planet gear teeth 274. The ring gear 256 includes a first set of ring gear teeth 276 and a second set of ring gear teeth 278. The sun gear 252, the plurality of planet gears 254, and the ring gear 256 may include any type of gear, such as, for example, spur gears (e.g., gear teeth that are straight cut and are not set at an angle relative to each other), or the like.

The first set of planet gear teeth 268 and the second set of planet gear teeth 270 of the first stage planet gear 260 mesh with the first set of sun gear teeth 264 and the second set of sun gear teeth 266 of the sun gear 252, respectively. The third set of planet gear teeth 272 of the second stage planet gear 262 meshes with the first set of ring gear teeth 276 of the ring gear 256. The fourth set of planet gear teeth 274 of the second stage planet gear 262 meshes with the second set of ring gear teeth 278 of the ring gear 256.

Each of the planet gears 254 of the plurality of planet gears 254 includes a pin 282 about which a respective planet gear 254 rotates. The pin 282 is coupled to the planet carrier 280 and is disposed within a bore 283 of a respective planet gear 254. Lubricant (e.g., oil) is provided between the pin 282 and a respective planet gear 254 such that the planet gear 254 rotates with respect to the pin 282. The second stage planet gear 262 is supported by one or more cylindrical roller bearings 285 that are disposed within the bore 283. FIG. 2 shows two roller bearings 285, but a respective planet gear 254 can include any number of roller bearings 285, as desired. The roller bearings 285 allow rotation of the planet gear 254 with respect to the pin 282.

The gearbox assembly 46 includes a gear ratio that defines a ratio of the speed of the input gear (e.g., the sun gear 252) to the speed of the output (e.g., the ring gear 256) through the gearbox assembly 46. Embodiments of the present disclosure detailed herein provide for increased gear ratios for a fixed gear envelope (e.g., with the same size ring gear), or alternatively, a smaller diameter ring gear may be used to achieve the same gear ratios. Thus, the embodiments disclosed herein allow for gear ratios suitable for large diameter turbine engines, or for smaller diameter turbine engines. A total gear ratio of the planet gear 254 includes a first gear ratio of the first stage planet gear 260 and a second gear ratio of the second stage planet gear 262. The first gear ratio of the first stage planet gear 260 is less than the second gear ratio of the second stage planet gear 262. The total gear ratio of the planet gear 254 is greater than or equal to seven (7:1) and less than or equal to twelve (12:1). The total gear ratio is selected based on engine size and power requirements and a selection of components for a particular gearbox assembly 46. For example, the total gear ratio is based on the speed of the fan 38 (e.g., the tip speed of the fan 38 of FIG. 1) and the speed of the LP turbine 30 (e.g., based on the number of stages of the LP turbine 30 of FIG. 1).

Figure 3:
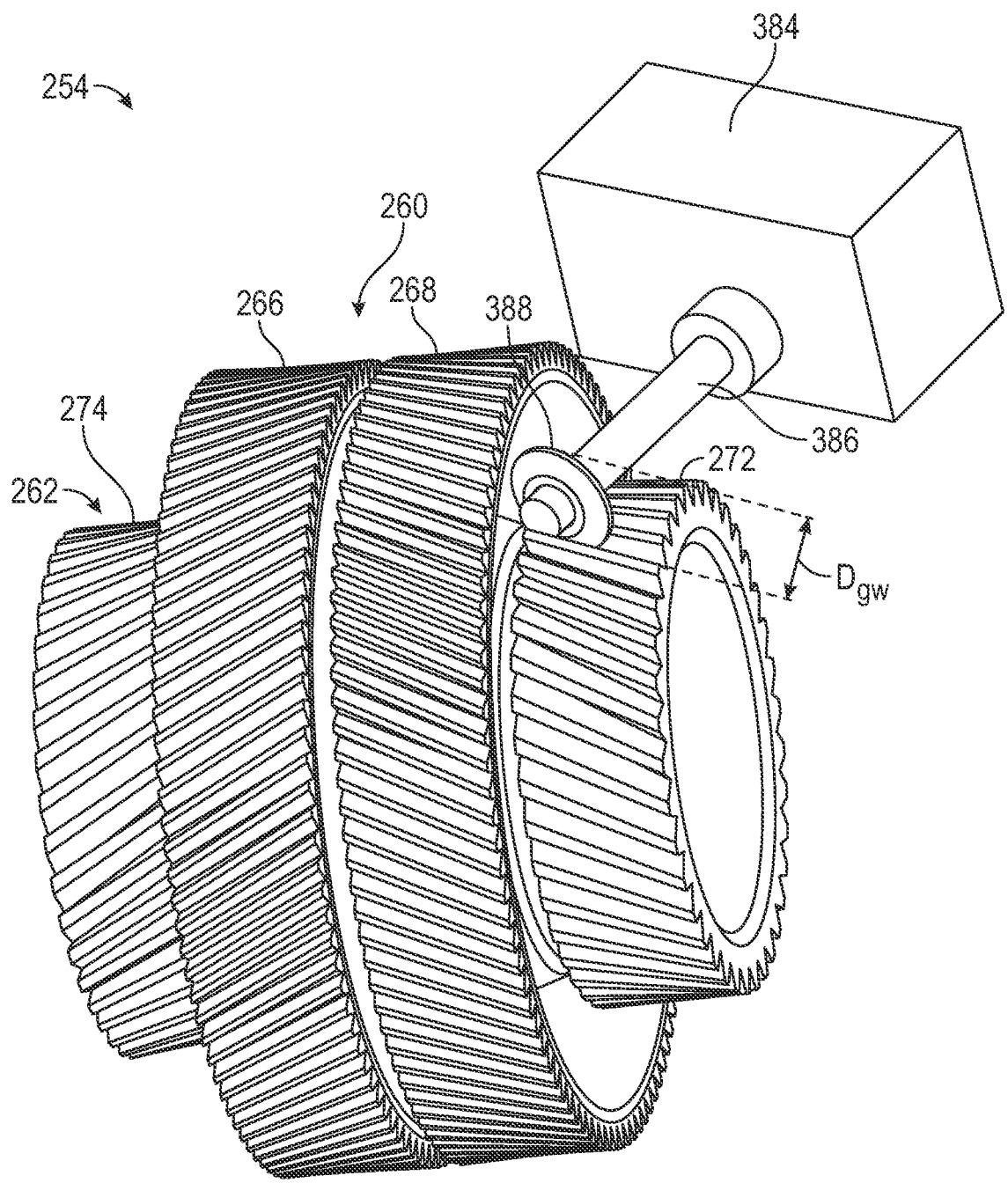
FIG. 3 illustrates a planet gear of the gearbox assembly of FIG. 2 and a grinding tool, according to an embodiment of the present disclosure.

FIG. 3 illustrates a planet gear 254 of the plurality of planet gears 254 and a grinding tool 384. The grinding tool 384 is illustrated schematically. The grinding tool 384 is a tool used for a grinding process to remove material from the gear teeth to finish forming the profile of the gear teeth during manufacturing of the gears. After a general shape of the gear teeth has been formed, the grinding tool 384 is used to achieve a desired quality parameter of the gear teeth (e.g., a desired surface finish of the gear teeth, a desired surface texture of the gear teeth, or accuracy in a form and a profile of the gear teeth). The grinding tool 384 includes a spindle 386 and a grinding wheel 388. The grinding wheel 388 is made of an abrasive material (e.g., aluminum oxide, ceramic, silicon carbide, diamond, or the like) to remove material from the gear teeth. FIG. 3 shows the grinding wheel 388 is a straight wheel. The grinding wheel 388 includes a grinding wheel diameter $D_{gw}$ that is defined as the diameter of the grinding wheel 388. The grinding wheel 388 may include any type of grinding wheel suited for grinding a component made from, for example, steel, alloys, other types of metal, or the like. The grinding wheel 388 is coupled to the spindle 386. The grinding tool 384 includes a motor (e.g., an electric motor) coupled to the spindle 386 to cause the spindle 386 to rotate during operation of the grinding tool 384. In this way, the grinding wheel 388 rotates and is used to remove material from the gear teeth.

Figure 4:
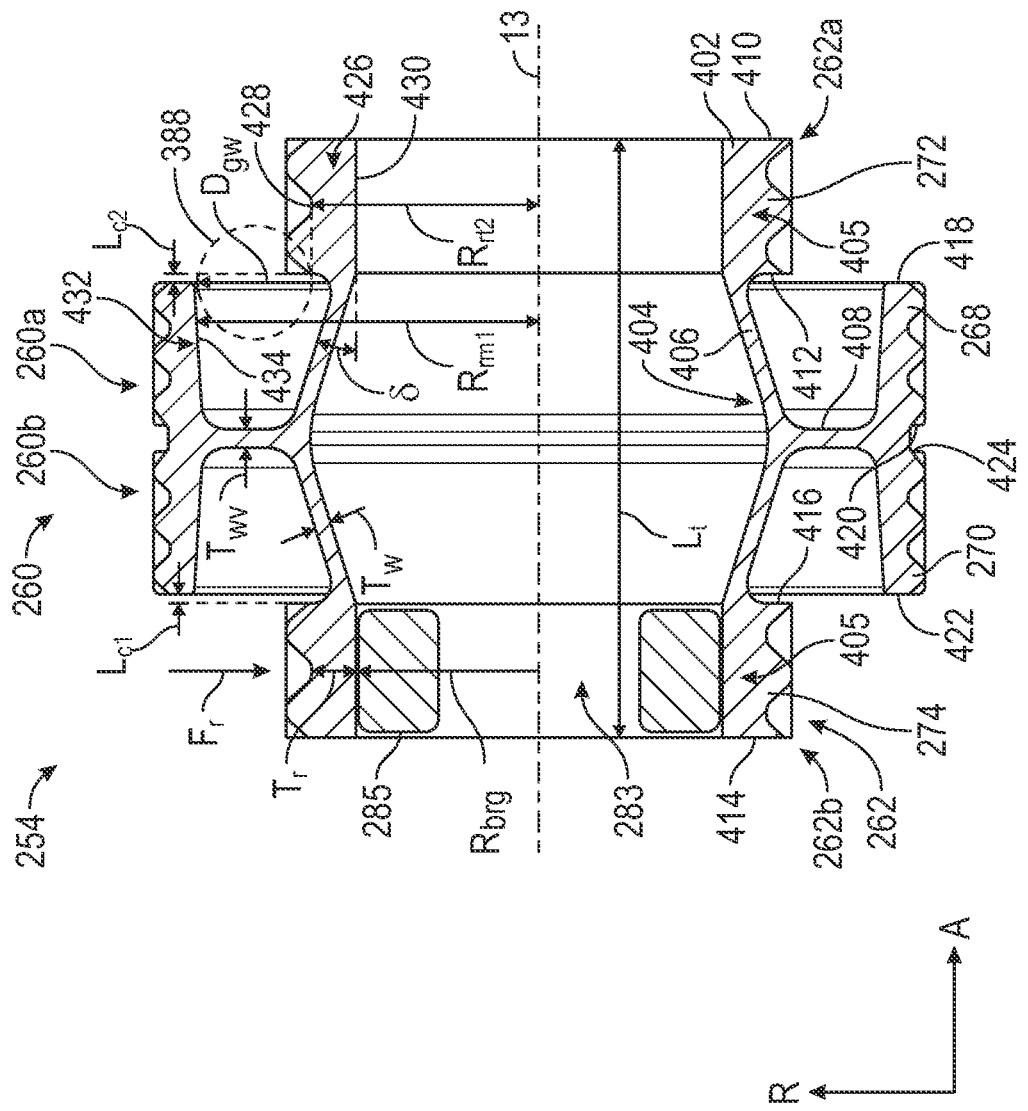
FIG. 4 is a schematic, cross-sectional side view of a planet gear of the gearbox assembly of FIG. 2, according to an embodiment of the present disclosure.

FIG. 4 is a schematic, cross-sectional side view of a planet gear 254 of the gearbox assembly 46, taken along the centerline axis 12 of the turbine engine 10 of FIG. 1, according to an embodiment of the present disclosure. FIG. 4 illustrates a single planet gear 254 isolated from the gearbox assembly 46. FIG. 4 shows the first stage planet gear 260 and the second stage planet gear 262 are supported by a layshaft 402 that has a tubular configuration. The layshaft 402 comprises an intermediate portion 404 that supports the first stage planet gear 260 between two outer portions 405. The two outer portions 405 support the second stage planet gear 262.

The intermediate portion 404 includes a web comprising an axial portion 406 and a radial portion 408. The axial portion 406 extends in a generally axial direction A at an angle δ with respect to the axis 13. In this way, the axial portion 406 is sloped with respect to the two outer portions 405. The angle δ is greater than zero degrees (0°) and less than or equal to sixty degrees (60°). As the angle δ is increased and approaches sixty degrees (60°), the stiffness of the intermediate portion 404 is increased, and, thus, additional support is provided the closer the angle δ is to sixty degrees (60°) relative to when the angle is closer to zero degrees (0°). As the angle δ approaches sixty degrees (60°), however the axial portion 406 may interfere with the grinding wheel 388 during operation of the grinding wheel 388 such that the grinding wheel 388 will contact the axial portion 406 and may remove material from the axial portion 406. Thus, the angle δ is selected based on a balance between providing a desired stiffness of the layshaft 402 and avoiding interference of the grinding wheel 388 with the axial portion 406. Preferably, the angle δ is between twenty degrees (20°) to thirty degrees (30°). Such a range provides an improved stiffness of the layshaft 402 relative to layshafts that do not have an angled axial portion, while also avoiding contact with the grinding wheel 388.

The axial portion 406 includes an axial portion thickness $T_w$ that is a thickness of the axial portion 406. The axial portion thickness $T_w$ is greater than or equal to three millimeters (3 mm) and less than or equal to ten millimeters (10 mm). The axial portion thickness $T_w$ is selected based on a balance between saving weight (e.g., less material) and providing structural support of the layshaft 402 for response to natural frequencies (e.g., vibration frequencies) experienced by the planet gear 254 during operation. For example, values of the axial portion thickness $T_w$ that are closer to three millimeters (3 mm) provide more weight savings, but less structural support. Values of the axial portion thickness $T_w$ that are closer to ten millimeters (10 mm) provide less weight savings, but greater structural support.

The radial portion 408 extends generally in the radial direction R. Thus, the axial portion 406 and the radial portion 408 of the intermediate portion 404 together define a generally Lambda shape. As detailed further below, the generally Lambda shape of the intermediate portion 404 allows the layshaft 402 to have a shorter axial length, and, thus, provides for a planet gear 254 that is lighter relative to planet gears without the benefit of the present disclosure. In this way, the layshaft 402 allows for a more compact gearbox assembly 46 (FIG. 1), and, thus, a more efficient turbine engine 10 (FIG. 1) relative to gearbox assemblies and turbine engines without the benefit of the present disclosure. The generally Lambda shape provides for an improved design of the intermediate portion 404 for accommodating deflections of the roller bearings 285. The radial portion 408 includes a radial portion thickness $T_{wv}$ that is a thickness of the radial portion 408. The radial portion thickness $T_{wv}$ is greater than or equal to two millimeters (2 mm) and less than or equal to ten millimeters (10 mm). The radial portion thickness $T_{wv}$ is selected based on a balance between saving weight (e.g., less material) and providing structural support of the layshaft 402 for response to natural frequencies (e.g., vibration frequencies) experienced by the planet gear 254 during operation. For example, values of the radial portion thickness $T_{wv}$ that are closer to two millimeters (2 mm) provide more weight savings, but less structural support. Values of the radial portion thickness $T_{wv}$ that are closer to ten millimeters (10 mm) provide less weight savings, but greater structural support.

FIG. 4 shows the first stage planet gear 260 includes a first portion 260a and a second portion 260b, and the second stage planet gear 262 includes a first portion 262a and a second portion 262b. In this way, each of the first stage planet gear 260 and the second stage planet gear 262 are symmetrical to provide axial balance during operation of the gearbox assembly 46 (FIG. 2). The first portion 262a of the second stage planet gear 262 includes an axially outer face 410 and an axially inner face 412. The second portion 262b of the second stage planet gear 262 includes an axially outer face 414 and an axially inner face 416. The first portion 260a of the first stage planet gear 260 includes an axially outer face 418 and an axially inner face 420. The second portion 260b of the first stage planet gear 260 includes an axially outer face 422 and an axially inner face 424.

The planet gear 254 includes a first axial distance $L_{c1}$ and a second axial distance $L_{c2}$ between the first stage planet gear 260 and the second stage planet gear 262. The first axial distance $L_{c1}$ is as the axial distance from the axially inner face 416 of the second portion 262b of the second stage planet gear 262 to the axially outer face 422 of the second portion 260b of the first stage planet gear 260. The second axial distance $L_{c2}$ is the axial distance from the axially inner face 412 of the first portion 262a of the second stage planet gear 262 to the axially outer face 418 of the first portion 260a of the first stage planet gear 260. The first axial distance $L_{c1}$ and the second axial distance $L_{c2}$ are preferably equal to provide symmetry such that the planet gear 254 is balanced during operation. In some embodiments, the first axial distance $L_{c1}$ and the second axial distance $L_{c2}$ are not equal (e.g., $L_{c1}$ is greater than $L_{c2}$ or $L_{c1}$ is less than $L_{c2}$). Each of the first axial distance $L_{c1}$ and the second axial distance $L_{c2}$ is greater than or equal to one millimeter (1 mm) and less than or equal to six millimeters (6 mm). The first axial distance $L_{c1}$ and the second axial distance $L_{c2}$ are selected based on a balance of minimizing an overall axial length of the planet gear 254 and providing an adequate clearance between the first stage planet gear 260 and the second stage planet gear 262 such that the ring gear 256

(FIG. 2) does not contact the first stage planet gear 260 when the ring gear 256 is intermeshed with the second stage planet gear 262.

The layshaft 402 of the planet gear 254 extends axially from the axially outer face 414 of the second portion 262b of the second stage planet gear 262 to the axially outer face 410 of the first portion 262a of the second stage planet gear 262. The layshaft 402 includes an axial length $L_t$ that is defined from the axially outer face 414 to the axially outer face 410. The axial length $L_t$ is the sum of an axial length of the second stage planet gear 262 (e.g., of the first portion 262a and the second portion 262b), an axial length of the first stage planet gear 260 (e.g., of the first portion 260a and the second portion 260b), the first axial distance $L_{c1}$, and the second axial distance $L_{c2}$. The axial length $L_t$ of the layshaft 402 is greater than or equal to one hundred fifty millimeters (150 mm) and less than or equal to three hundred millimeters (300 mm). The axial length $L_t$ is selected based on a balance between having a shorter axial length, while maintaining the clearance between the first stage planet gear 260 and the second stage planet gear 262, as discussed above. A shorter axial length $L_t$ allows for the planet gear 254 to be shorter, which allows the gearbox assembly 46 to be shorter, relative to planet gears and gearbox assemblies without the benefit of the present disclosure. An overall weight of the gearbox assembly 46 is reduced, thus reducing an overall weight of the turbine engine 10, which leads to improved engine efficiency relative to turbine engines without the benefit of the present disclosure.

The roller bearing 285 includes a roller bearing radius $R_{brg}$ defined as the radius of the roller bearing 285. FIG. 4 shows only a single roller bearing 285 for clarity. The roller bearing radius $R_{brg}$ is greater than or equal to fifty millimeters (50 mm) and less than or equal to one hundred forty millimeters (140 mm). The roller bearing radius $R_{brg}$ is selected based on an amount of torque or power transferred through the gearbox assembly 46 (FIG. 1) for a particular turbine engine 10 (FIG. 1). For example, for turbine engines that are larger and have greater power output (e.g., a greater amount of torque is transferred through the gearbox assembly 46), the roller bearing radius $R_{brg}$ is closer to one hundred forty millimeters (140 mm). For turbine engines that are smaller and have a lower power output (e.g., a smaller amount of torque is transferred through the gearbox assembly 46), the roller bearing radius $R_{brg}$ is closer to fifty millimeters (50 mm).

The second stage planet gear 262 includes a rim 426. The gear teeth of the second stage planet gear 262 extend from the rim 426 at a root 428 of the gear teeth. In this way, the rim 426 is defined from a radially inner surface 430 to the root 428. During operation of the gearbox assembly 46, a radial force $F_r$ acts on the rim 426 due to the mesh between the ring gear 256 (FIG. 2) and the second stage planet gear 262. The radial force $F_r$ squeezes the rim 426 and deforms the rim 426. The rim 426 includes a rim thickness $T_r$ defined as a thickness of the rim 426 from the radially inner surface 430 to the root 428. The rim thickness $T_r$ is greater than or equal to ten millimeters (10 mm) and less than or equal to forty millimeters (40 mm). The rim thickness $T_r$ is selected for providing proper function of the roller bearing 285, while minimizing the weight of the planet gear 254. For example, if the rim thickness Tr is too thin, the radial force $F_r$ will deform the rim 426 such that the roller bearing 285 may be impeded from functioning and the planet gear 254 may be impeded from rotating properly about the pin 282 (FIG. 2). If the rim thickness $T_r$ is too great, the weight of the planet gear 254 increases, thus increasing the weight of the gearbox assembly 46 and reducing engine efficiency of the turbine engine 10. A ratio of the radial force $F_r$ to the rim thickness $T_r$ is greater than or equal to three kilonewtons per millimeter (3 kN/mm) and less than or equal to nine kilonewtons per millimeter (9 kN/mm). The ratio of the radial force $F_r$ to the rim thickness $T_r$ is selected based on providing proper function of the roller bearing 285 while minimizing weight of the planet gear 254, as detailed above.

The layshaft 402 includes a volume defined as the volume of the material of the layshaft 402. The volume of the layshaft 402 is greater than or equal to three cubic decimeters (3 dm$^3$) (e.g., liters) and less than or equal to twenty cubic decimeters (20 dm$^3$) (e.g., liters). The volume of the layshaft 402 is selected based on a size of the planet gear 254 for a particular turbine engine 10 application. For example, the volume of the layshaft 402 will be greater (e.g., closer to twenty cubic decimeters (20 dm$^3$)) for gearbox assemblies that are utilized in larger and more powerful turbine engines, and the volume of the layshaft 402 will be less (e.g., closer to three cubic decimeters (3 dm$^3$)) for smaller and less powerful turbine engines. The volume of the layshaft 402 will increase as the size of the layshaft 402 increases.

FIG. 4 illustrates the grinding wheel 388 schematically. The grinding wheel 388 includes the grinding wheel diameter $D_{gw}$ that is the diameter of the grinding wheel 388. The first stage planet gear 260 includes a rim 432 that has an inner surface 434. The first stage planet gear 260 includes a first stage rim inner radius $R_{rm1}$ defined as a radius of the first stage planet gear 260 (measured from axis 13 to the radially inner surface 434). The second stage planet gear 262 includes a second stage root radius $R_{rt2}$ defined as a radius of the second stage planet gear 262 (measured from axis 13 to the root 428).

As mentioned earlier, the inventors sought to improve upon the size and weight of a power gearbox. With regard to the sizing and weight requirements consideration was given not simply to those factors affecting the inertial and thermal loading environment such as the size of gears to carry a load, durability, heat dissipation, lubrication requirements but also the manufacturability of parts. In contrast to existing aircraft engines requiring a power gearbox (e.g., gearbox that couples a low power shaft to the fan) that either utilizes a relatively low gear ratio or lower power rating requirement on the gearbox, embodiments considered (high power rating and gear ratio) presented challenges in determining how the gearbox could be reduced in size and weight while still being capable of transferring torque with high efficiency, and to account for manufacturability in a reliable, repeatable manner.

During the course of the evaluation of different embodiments as set forth herein with the goal of improving upon the weight and axial length of a gearbox, the inventors discovered, unexpectedly, that there exists a relationship among the first stage rim inner radius $R_{rm1}$, the second stage root radius $R_{rt2}$, and the grinding wheel diameter $D_{gw}$, which uniquely identifies a finite and a readily ascertainable (in view of this disclosure) number of embodiments suitable for a particular architecture that accounts for the clearance needed between the first stage planet gear 260 and the second stage planet gear 262. The discovery enables one to reduce the axial length between the first and second stages while accounting for the manufacturability of the planet gear. The permissible axial length $L_t$ of the layshaft 402 is found that accounts for the radial clearance needed between the first stage planet gear 260 and the second stage planet gear 262 for the grinding operation during manufacturing of the planet gear 254. This relationship is referred to as the Radial Stage Distance, in (1):

$$\text{Radial Stage Distance}(R_{rm1} - R_{rt2}) \geq D_{gw} \quad (1)$$

where the Radial Stage Distance (RSD) is a difference between the first stage rim inner radius $R_{rm1}$ and the second stage root radius $R_{rt2}$ and where the Radial Stage Distance is greater than or equal to the grinding wheel diameter $D_{gw}$. As discussed further below, we have identified a range of the Radial Stage Distance that enables a planet gear 254 to be designed for a wide range of turbine engine designs.

Using this unique relationship, the planet gear axial length $L_t$ may be limited or constrained only by the access needed to form the part, whether by a grinding wheel or other tool. Additionally, using the RSD as a guide, a plurality of planet gears 254 can be developed early in the design process, while allowing for the grinding wheel 388 to be used in forming the gear teeth of the second stage planet gear 262 without contacting the first stage planet gear 260.

We also desire to arrive at design possibilities at an early stage of design, so that the downstream selection of candidate improved designs, given the tradeoffs, become more predictable. Heretofore, the process has sometimes been more ad hoc, selecting one design or another without knowing the impact when a concept is first taken into consideration. For example, and referring to FIG. 1, various aspects of the fan section 14 design (e.g., fan 38 design, the fan blades 40 design, etc.), the combustion section 26 design, the compressor section 21 design, the turbine section 27 design, etc., may not be known, but such components impact the radial force $F_r$ on the planet gear 254 and the gear ratio of the gearbox assembly 46 (FIG. 2) and, thus, may influence the design of the planet gear 254.

The RSD relationship is preferably used for multi-stage gearboxes for aircraft and that have relatively high-power ratings (e.g., greater than 7 megawatts, greater than 15 megawatts, or greater than 22 megawatts) and gear ratios of between seven (7:1) and twelve (12:1). Still various embodiments of the gearbox assembly allow for gear ratios between seven (7:1) and eleven (11:1), and between eight (8:1) and ten (10:1).

TABLE 1

| Embodiment | $R_{r1}$ (mm) | $R_{r2}$ (mm) | $R_{brg}$ (mm) | Radial Stage Distance (mm) |
|---|---|---|---|---|
| 1 | 101 | 68.5 | 57 | 32.5 |
| 2 | 98.5 | 63.5 | 51.5 | 35 |
| 3 | 149 | 98 | 79 | 51 |
| 4 | 164 | 100 | 81 | 64 |
| 5 | 146 | 100 | 81.5 | 46 |
| 6 | 138 | 95 | 78 | 43 |
| 7 | 157 | 102 | 83 | 55 |
| 8 | 140 | 96 | 78 | 44 |
| 9 | 153 | 95 | 77 | 58 |
| 10 | 142 | 94 | 76 | 48 |
| 11 | 146 | 95 | 77.5 | 51 |
| 12 | 147 | 97 | 78 | 50 |
| 13 | 240 | 168 | 136.5 | 72 |
| 14 | 233 | 163.5 | 132.5 | 69.5 |

Table 1 describes exemplary embodiments 1 to 14 identifying the Radial Stage Distance for various turbine engines. Embodiments 1 to 14 may represent the turbine engine 10 described with respect to FIG. 1 and can be applied to the gearbox assembly 46 shown in FIG. 2. In Table 1, the Radial Stage Distance is determined based on the relationship (1) described above.

Figure 5:
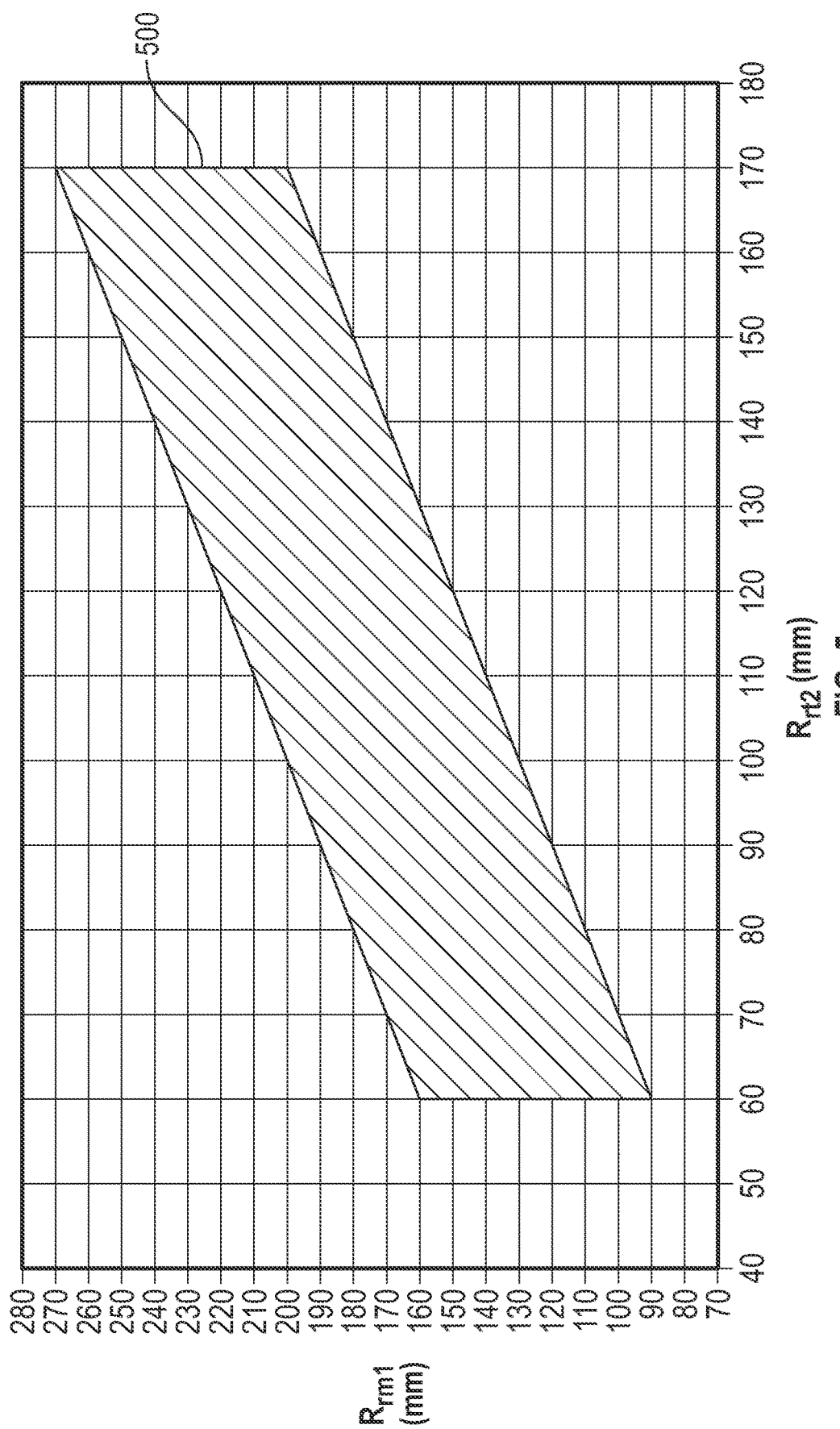
FIG. 5 is a graph illustrating a first stage rim inner radius as a function of a second stage root radius, according to embodiments of the present disclosure.

FIG. 5 represents, in graph form, the first stage rim inner radius Rn as a function of the second stage root radius $R_{rt2}$. Table 1 and FIG. 5 show that the first stage rim inner radius Rn may be changed based on the second stage root radius $R_{rt2}$. An area 500 represents the boundaries of the first stage rim inner radius $R_{rm1}$ as a function of the second stage root radius $R_{rt2}$. The first stage rim inner radius $R_{rm1}$ is greater than or equal to ninety millimeters (90 mm) and less than or equal to two hundred seventy millimeters (270 mm). The second stage root radius $R_{rt2}$ is greater than or equal to sixty millimeters (60 mm) and less than or equal to one hundred seventy millimeters (170 mm). FIG. 5 shows that as the second stage root radius $R_{rt2}$ increases, the first stage rim inner radius $R_{rm1}$ increases. For example, as the second stage root radius $R_{rt2}$ increases, the first stage rim inner radius $R_{rm1}$ is increased such that the Radial Stage Distance is greater than or equal to the grinding wheel diameter $D_{gw}$. The lower ends of the ranges for the first stage rim inner radius $R_{rm1}$ and for the second stage root radius $R_{rt2}$ are selected for smaller turbine engines, and the upper ends of the ranges are selected for larger turbine engines. Thus, the first stage rim inner radius $R_{rm1}$ and the second stage root radius $R_{rt2}$ increase as the turbine engine size increases. For example, the lower end of the ranges is selected for smaller turbine engines that are used for narrow body aircraft (e.g., single aisle aircraft having a cabin width less than about four meters (4 m)) or regional turboprop aircraft, and the upper end of the ranges is selected for larger turbine engines that are used in widebody aircraft (e.g., twin-aisle aircraft having a cabin width greater than about four meters (4 m)).

Figure 6:
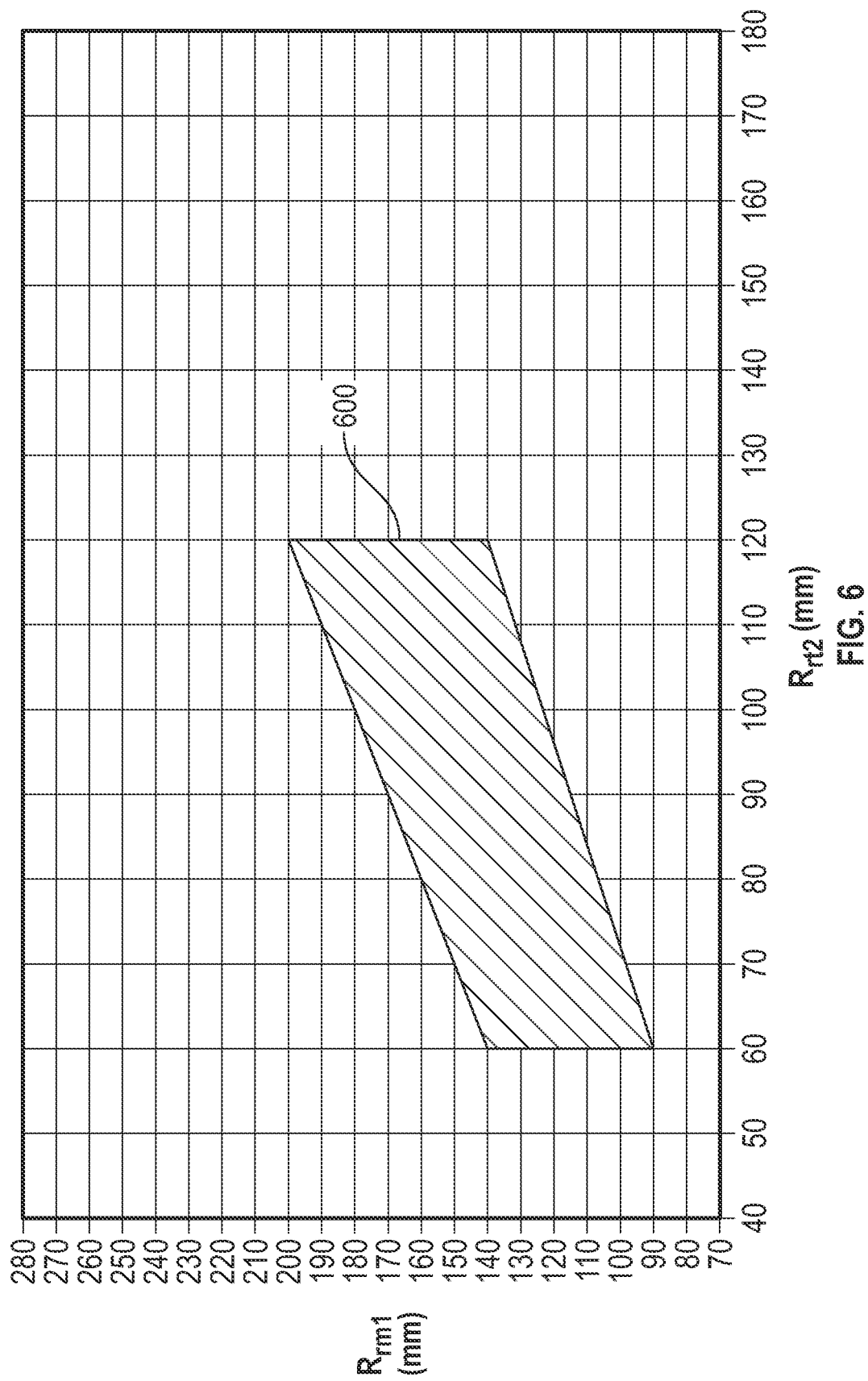
FIG. 6 is a graph illustrating a first stage rim inner radius as a function of a second stage root radius, according to another embodiment.

FIG. 6 represents, in graph form, the first stage rim inner radius $R_{rm1}$ as a function of the second stage root radius $R_{rt2}$, according to another embodiment. An area 600 represents the boundaries of the first stage rim inner radius $R_{rm1}$ as a function of the second stage root radius $R_{rt2}$. FIG. 6 shows that the first stage rim inner radius $R_{rm1}$ is greater than or equal to ninety millimeters (90 mm) and less than or equal to two hundred millimeters (200 mm). The second stage root radius $R_{rt2}$ is greater than or equal to sixty millimeters (60 mm) and less than or equal to one hundred twenty millimeters (120 mm). The ranges of the first stage rim inner radius $R_{rm1}$ and the second stage root radius $R_{rt2}$ in FIG. 6 are selected for turbine engines used in narrow body aircraft and/or regional turboprop engines.

Figure 7:
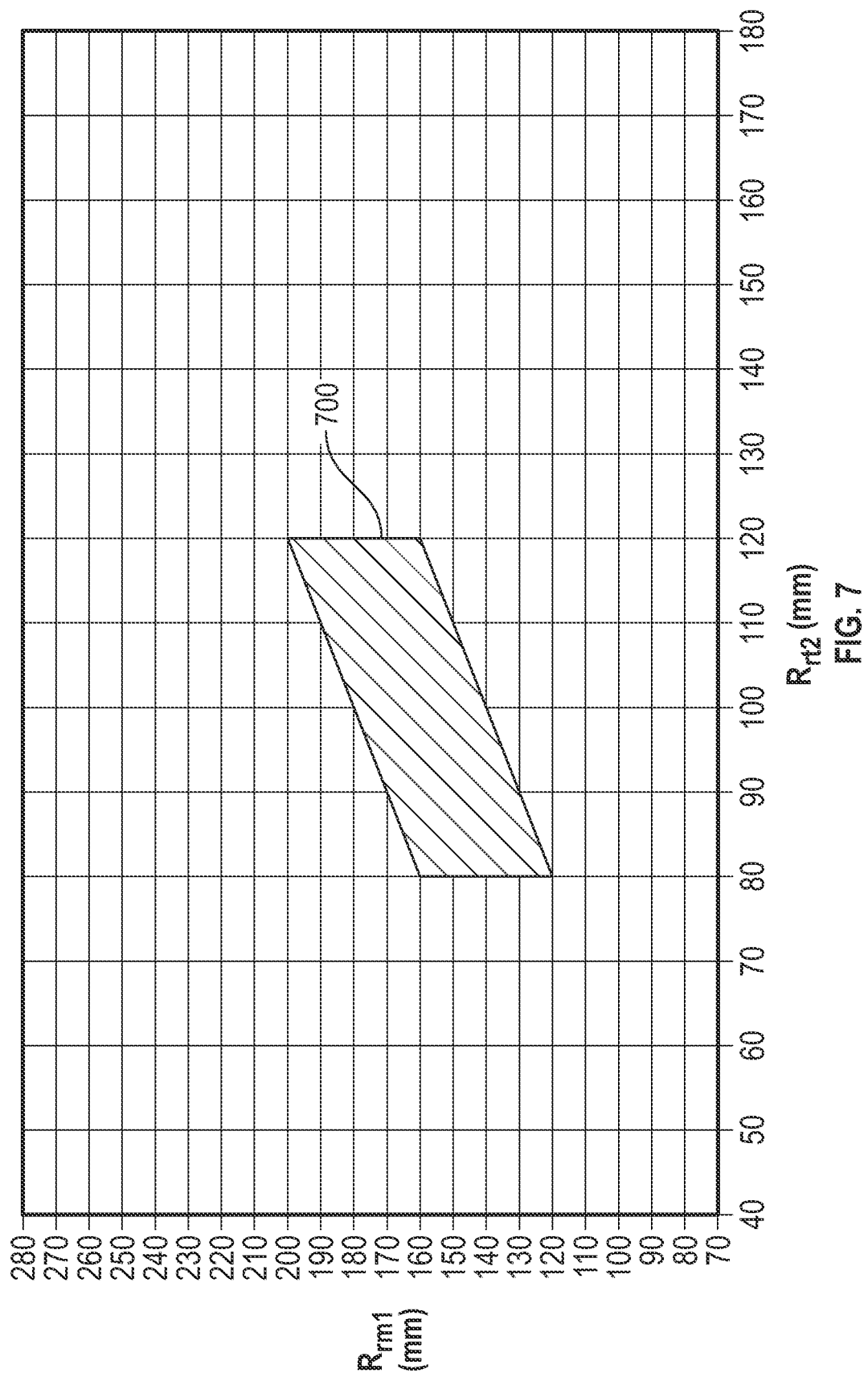
FIG. 7 is a graph illustrating a first stage rim inner radius as a function of a second stage root radius, according to another embodiment.

FIG. 7 represents, in graph form, the first stage rim inner radius $R_{rm1}$ as a function of the second stage root radius $R_{rt2}$, according to another embodiment. An area 700 represents the boundaries of the first stage rim inner radius $R_{rm1}$ as a function of the second stage root radius R. FIG. 7 shows that the first stage rim inner radius $R_{rm1}$ is greater than or equal to one hundred twenty millimeters (120 mm) and less than or equal to two hundred millimeters (200 mm). The second stage root radius $R_{rt2}$ is greater than or equal to eighty millimeters (80 mm) and less than or equal to one hundred twenty millimeters (120 mm). The ranges of the first stage rim inner radius $R_{rm1}$ and the second stage root radius $R_{rt2}$ in FIG. 6 are selected for turbine engines used in narrow body aircraft.

Figure 8:
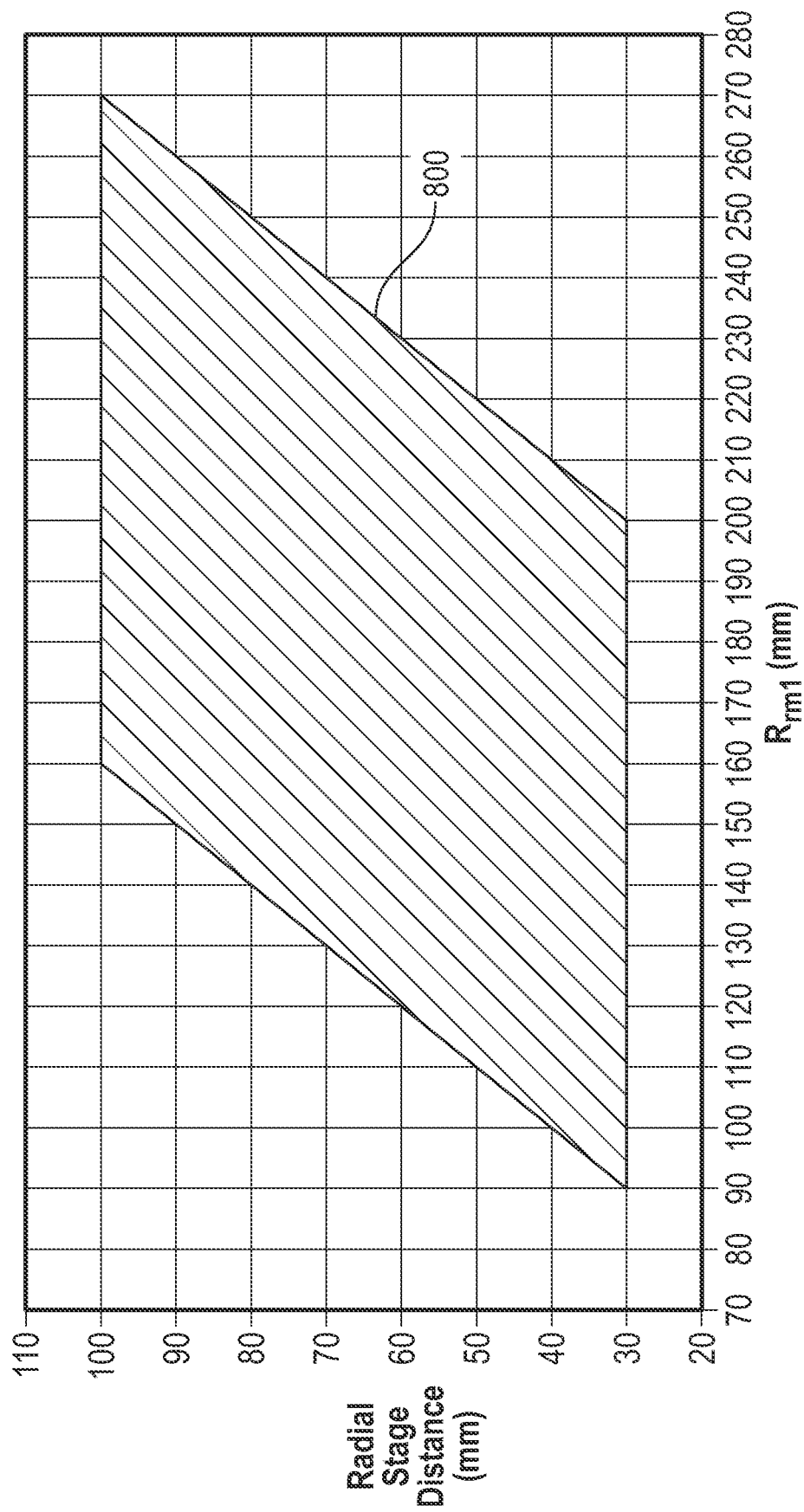
FIG. 8 is a graph illustrating a Radial Stage Distance as a function of a first stage rim inner radius, according to embodiments of the present disclosure.

FIG. 8 represents, in graph form, the Radial Stage Distance as a function of the first stage rim inner radius $R_{rm1}$. Table 1 and FIG. 8 show that the Radial Stage Distance may be changed based on the first stage rim inner radius $R_{rm1}$. An area 800 represents the boundaries of the Radial Stage Distance as a function of the first stage rim inner radius $R_{rm1}$. The Radial Stage Distance is greater than or equal to thirty millimeters (30 mm) and less than or equal to one hundred millimeters (100 mm) for values of the first stage rim inner radius $R_{rm1}$ between ninety millimeters (90 mm) and two hundred seventy millimeters (270 mm). FIG. 8 shows that as the first stage rim inner radius $R_{rm1}$ increases, the Radial Stage Distance increases. For example, as the first stage rim inner radius $R_{rm1}$ increases, the Radial Stage Distance is increased such that the Radial Stage Distance is greater than or equal to the grinding wheel diameter $D_{gw}$. Thus, the Radial Stage Distance is selected based on a balance between reducing the axial length $L_t$ of the layshaft 402 and allowing the grinding wheel 388 to fit between the first stage planet gear 260 and the second stage planet gear 262 without contacting the first stage planet gear 260 while the grinding wheel 388 is used to form the gear teeth of the second stage planet gear 262, as detailed above. The range of the Radial Stage Distance provided in FIG. 8 is applicable over a wide range of turbine engine sizes, such as turbine engines used for narrow body aircraft, for regional turboprop aircraft, or for widebody aircraft.

Figure 9:
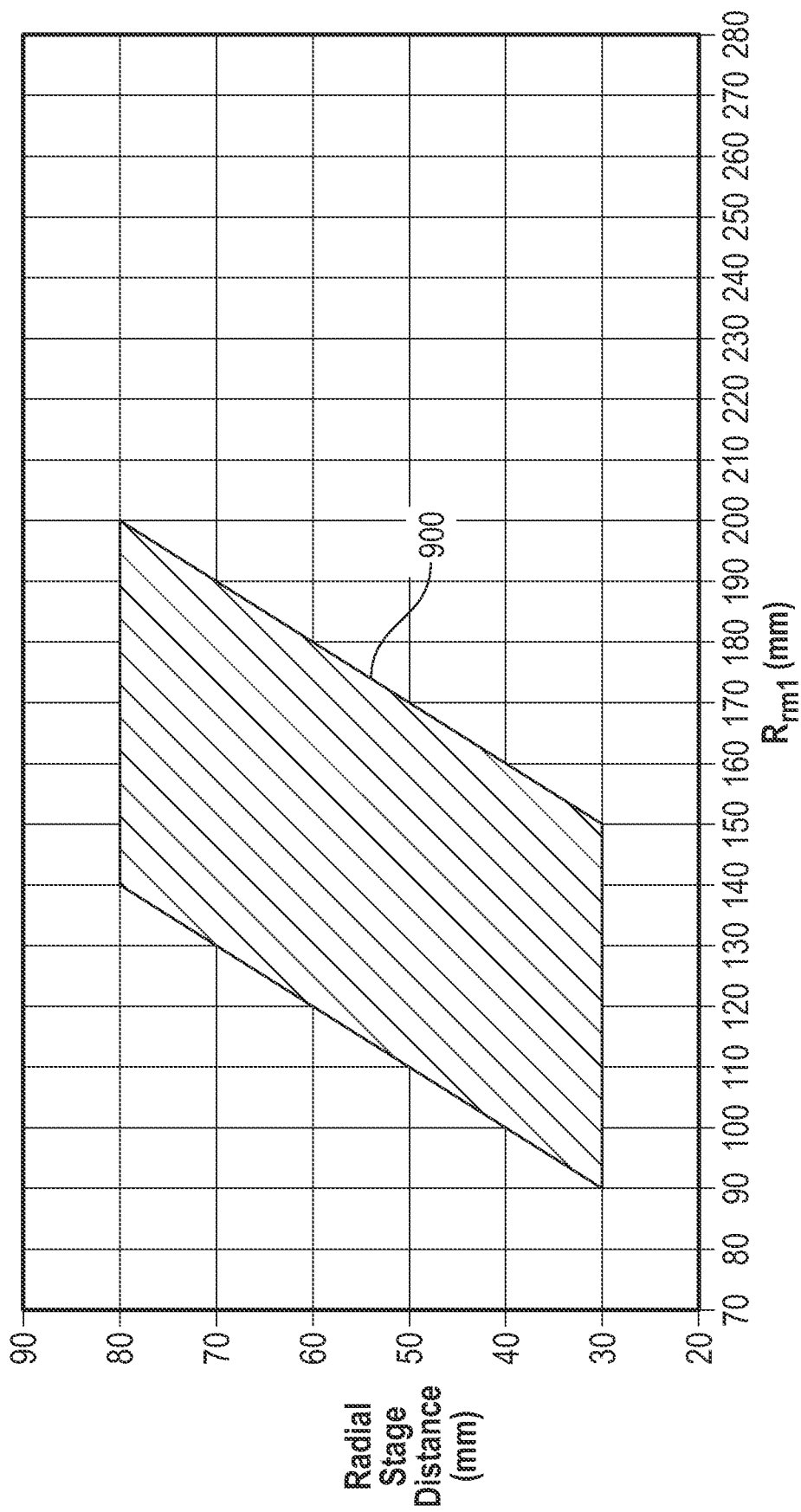
FIG. 9 is a graph illustrating a Radial Stage Distance as a function of a first stage rim inner radius, according to embodiments of the present disclosure.

FIG. 9 represents, in graph form, the Radial Stage Distance as a function of the first stage rim inner radius $R_{rm1}$, according to another embodiment. FIG. 9 shows that the Radial Stage Distance may be changed based on the first stage rim inner radius $R_{rm1}$. An area 900 may represents the boundaries of the Radial Stage Distance as a function of the first stage rim inner radius $R_{rm1}$. The Radial Stage Distance in FIG. 9 is greater than or equal to thirty millimeters (30 mm) and less than or equal to eighty millimeters (80 mm) for values of the first stage rim inner radius Rind between ninety millimeters (90 mm) and two hundred millimeters (200 mm). FIG. 9 shows that as the first stage rim inner radius $R_{rm1}$ increases, the Radial Stage Distance increases, as detailed above. The range of the Radial Stage Distance in FIG. 9 is selected for turbine engines used in narrow body aircraft and/or regional turboprop engines.

Figure 10:
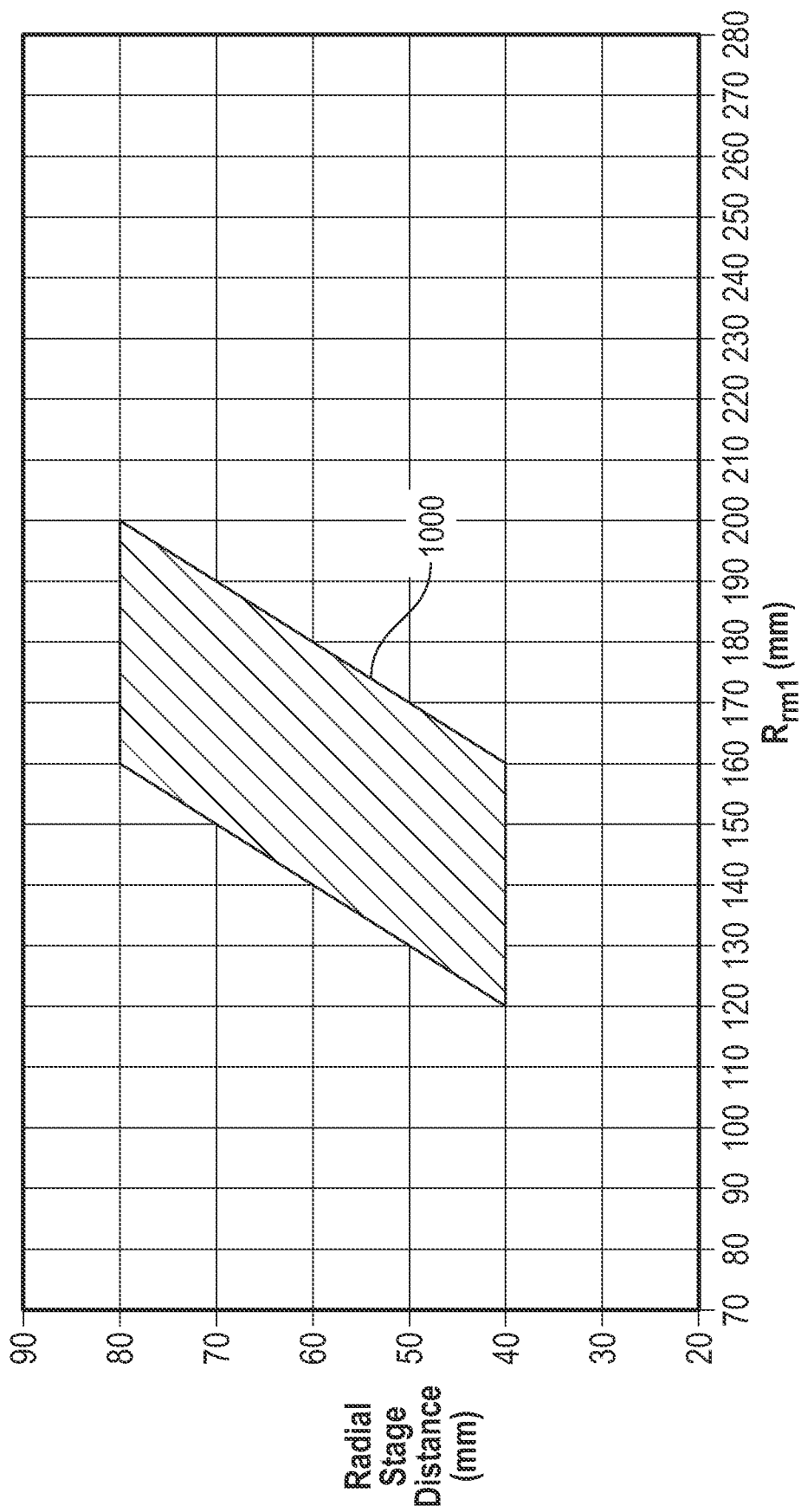
FIG. 10 is a graph illustrating a Radial Stage Distance as a function of a first stage rim inner radius, according to another embodiment.

FIG. 10 represents, in graph form, the Radial Stage Distance as a function of the first stage rim inner radius $R_{rm1}$, according to another embodiment. FIG. 10 shows that the Radial Stage Distance may be changed based on the first stage rim inner radius $R_{rm1}$. An area 1000 represents the boundaries of the Radial Stage Distance as a function of the first stage rim inner radius $R_{rm1}$. The Radial Stage Distance in FIG. 10 is greater than or equal to forty millimeters (40 mm) and less than or equal to eighty millimeters (80 mm) for values of the first stage rim inner radius $R_{rm1}$ between one hundred twenty millimeters (120 mm) and two hundred millimeters (200 mm). FIG. 10 shows that as the first stage rim inner radius $R_{rm1}$ increases, the Radial Stage Distance increases, as detailed above. The range of the Radial Stage Distance in FIG. 10 is selected for turbine engines used in narrow body aircraft.

Figure 11:
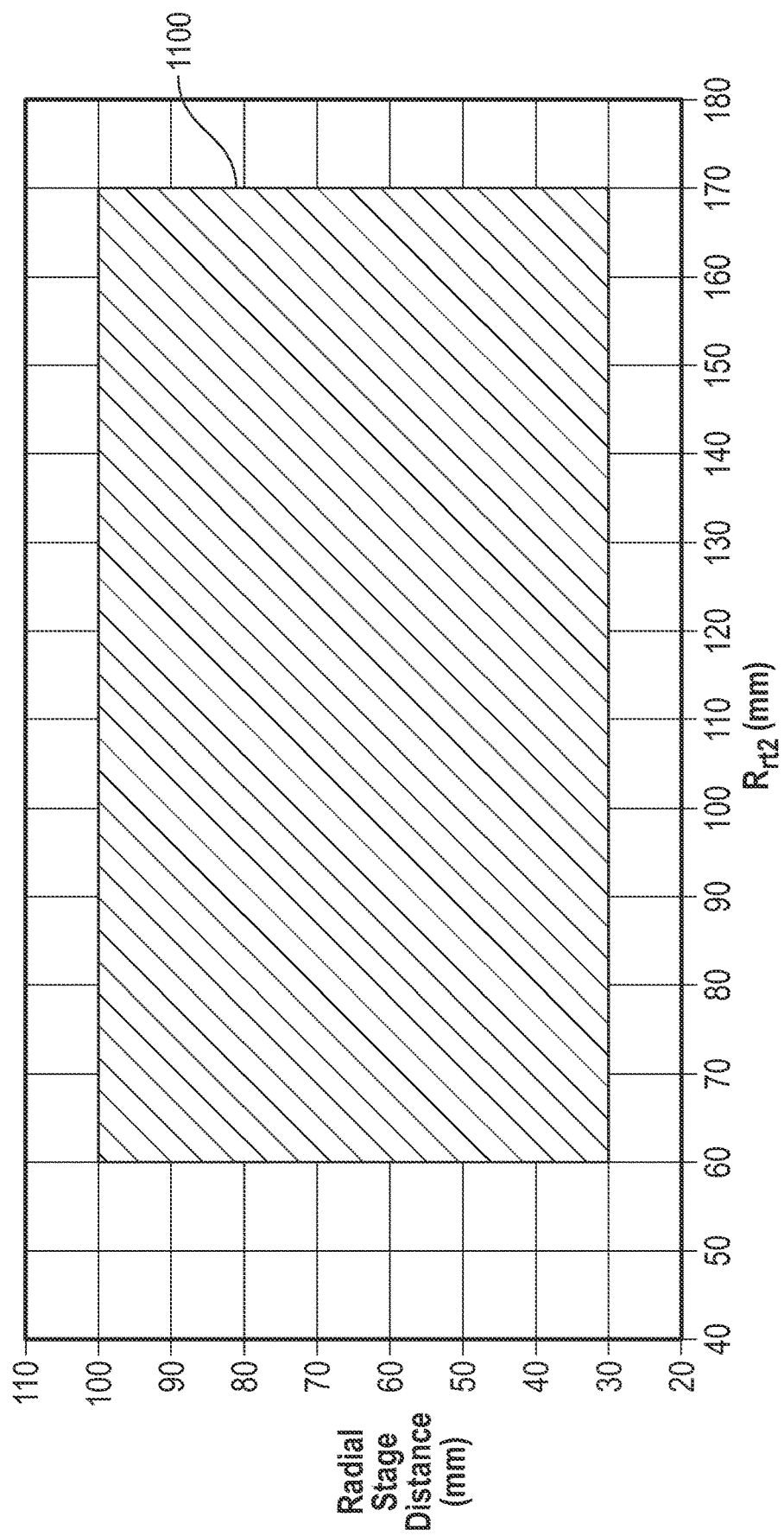
FIG. 11 is a graph illustrating a Radial Stage Distance as a function of a second stage root radius, according to embodiments of the present disclosure.

FIG. 11 represents, in graph form, the Radial Stage Distance as a function of the second stage root radius $R_{rt2}$. Table 1 and FIG. 11 show that the Radial Stage Distance may be changed based on the second stage root radius $R_{rt2}$. An area 1100 represents the boundaries of the Radial Stage Distance as a function of the second stage root radius $R_{rt2}$. The Radial Stage Distance is greater than or equal to thirty millimeters (30 mm) and less than or equal to one hundred millimeters (100 mm) for values of the second stage root radius $R_{rt2}$ between sixty millimeters (60 mm) and one hundred seventy millimeters (170 mm). In general, as the second stage root radius $R_{rt2}$ increases, the Radial Stage Distance increases. For example, as the second stage root radius $R_{rt2}$ increases, the Radial Stage Distance is increased such that the Radial Stage Distance is greater than or equal to the grinding wheel diameter $D_{gw}$. Thus, the Radial Stage Distance is selected based on a balance between reducing the axial length $L_t$ of the layshaft 402 and allowing the grinding wheel 388 to fit between the first stage planet gear 260 and the second stage planet gear 262 without contacting the first stage planet gear 260 while the grinding wheel 388 is used to form the gear teeth of the second stage planet gear 262, as detailed above. The range of the Radial Stage Distance provided in FIG. 11 is applicable over a wide range of turbine engine sizes, such as turbine engines used for narrow body aircraft, for regional turboprop aircraft, or for widebody aircraft.

Figure 12:
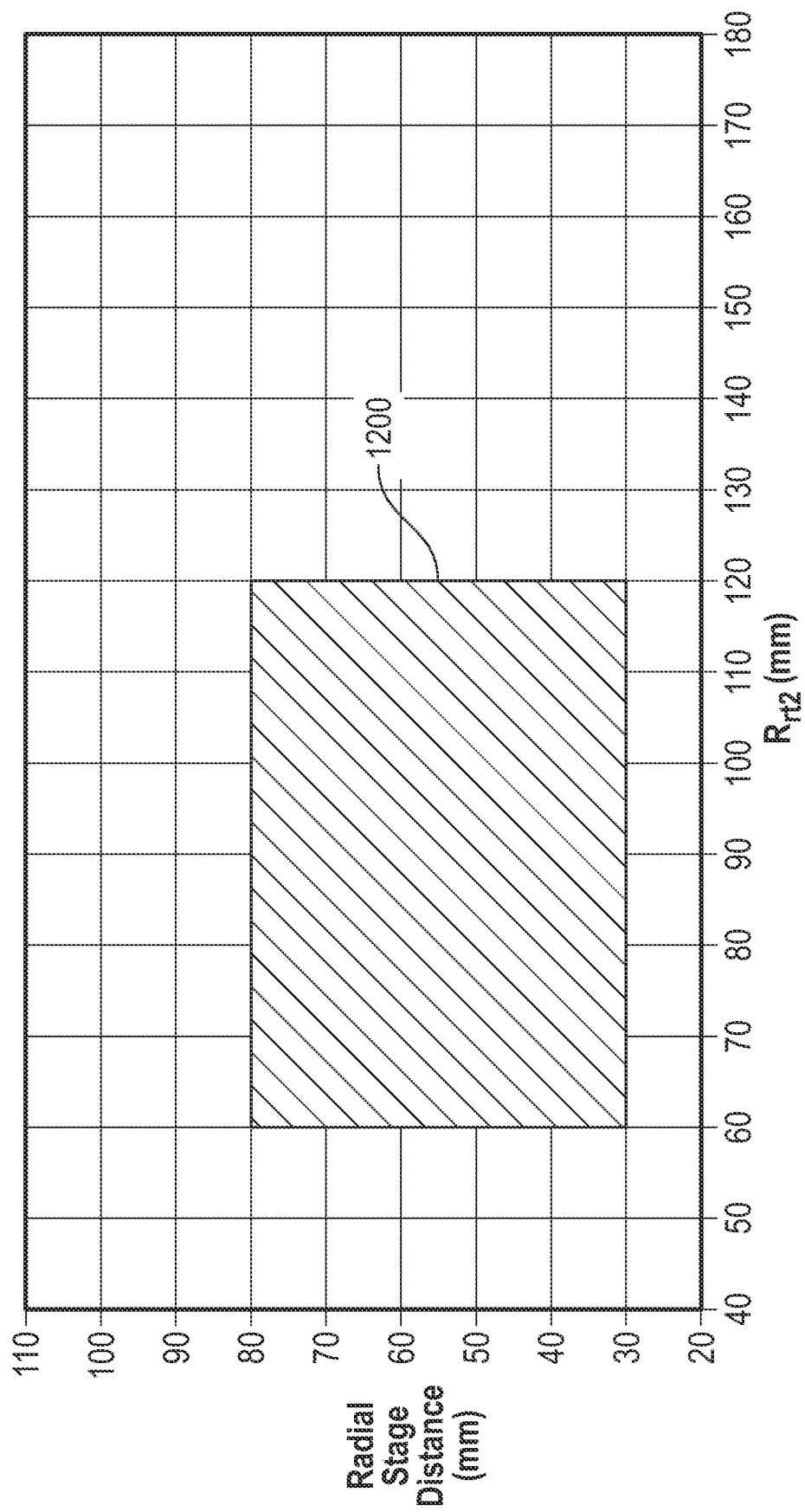
FIG. 12 is a graph illustrating a Radial Stage Distance as a function of a second stage root radius, according to another embodiment.

FIG. 12 represents, in graph form, the Radial Stage Distance as a function of the second stage root radius $R_{rt2}$, according to another embodiment. Table 1 and FIG. 12 shows that the Radial Stage Distance may be changed based on the second stage root radius $R_{rt2}$. An area 1200 represents the boundaries of the Radial Stage Distance as a function of the second stage root radius $R_{rt2}$. The Radial Stage Distance in FIG. 12 is greater than or equal to thirty millimeters (30 mm) and less than or equal to eighty millimeters (80 mm) for values of the second stage root radius $R_{rt2}$ between sixty millimeters (60 mm) and one hundred twenty millimeters (120 mm). As the second stage root radius $R_{rt2}$ increases, the Radial Stage Distance increases, as detailed above. The range of the Radial Stage Distance in FIG. 12 is selected for turbine engines used in narrow body aircraft and/or regional turboprop engines.

Figure 13:
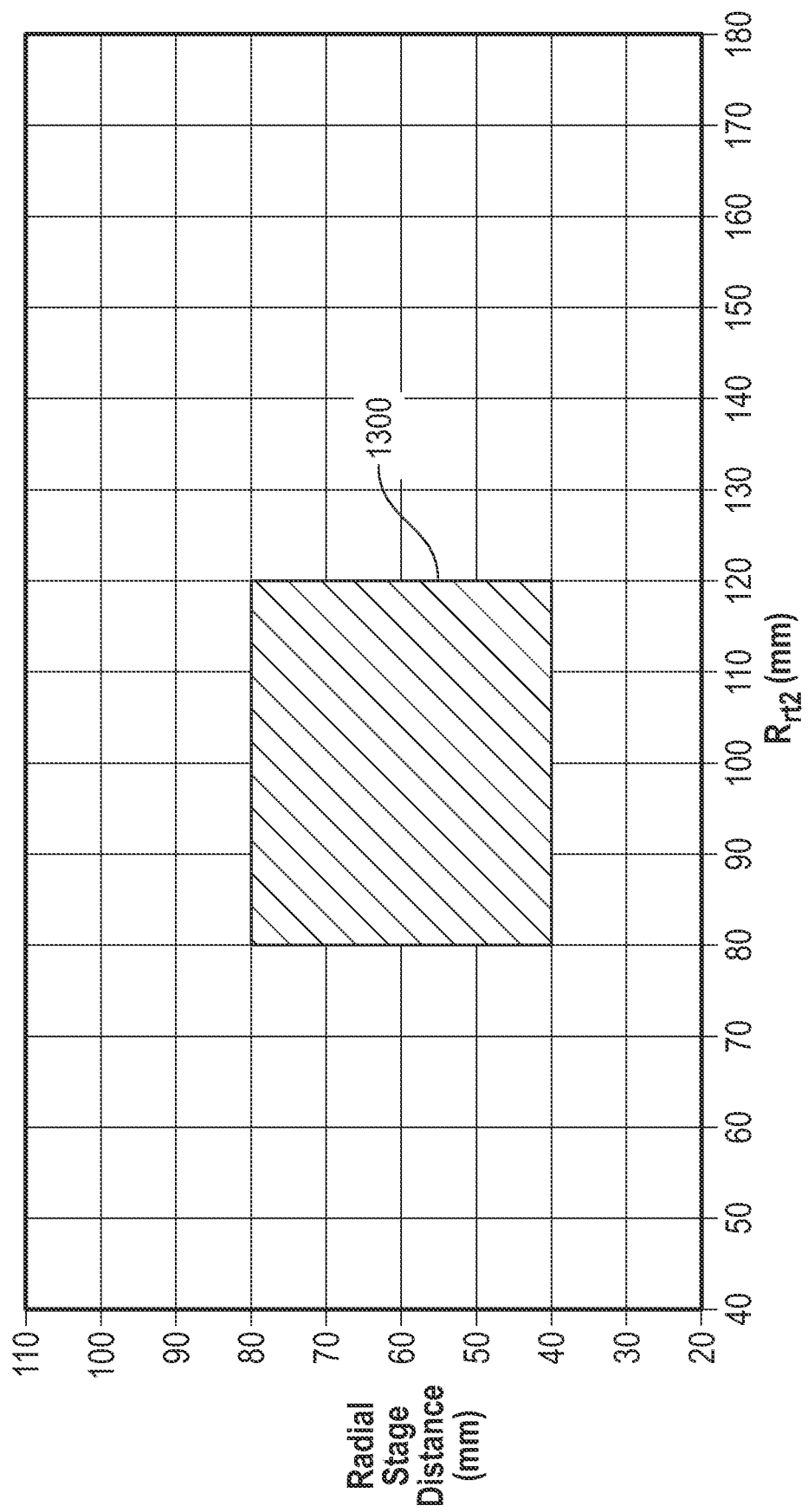
FIG. 13 is a graph illustrating a Radial Stage Distance as a function of a second stage root radius, according to another embodiment.

FIG. 13 represents, in graph form, the Radial Stage Distance as a function of the second stage root radius Ritz, according to another embodiment. FIG. 13 shows that the Radial Stage Distance may be changed based on the second stage root radius $R_{rt2}$. An area 1300 represents the boundaries of the Radial Stage Distance as a function of the second stage root radius $R_{rt2}$. The Radial Stage Distance in FIG. 13 is greater than or equal to forty millimeters (40 mm) and less than or equal to eighty millimeters (80 mm) for values of the second stage root radius Ritz between eighty millimeters (80 mm) and one hundred twenty millimeters (120 mm). As the second stage root radius $R_{rt2}$ increases, the Radial Stage Distance increases, as detailed above. The range of the Radial Stage Distance in FIG. 13 is selected for turbine engines used in narrow body aircraft.

The embodiments detailed herein provide for a layshaft 402 design that minimizes the axial length $L_t$ of the layshaft 402, and, thus, a turbine engine axial length. The layshaft 402 design is selected such that the axial length Lt is reduced, while the Radial Stage Distance is greater than or equal to the grinding wheel diameter $D_{gw}$ to ensure the grinding wheel 388 is able to fit between the first stage planet gear 260 and the second stage planet gear 262 during manufacturing the planet gear 254. The embodiments detailed herein provide for a layshaft 402 having a general Lambda shape. The parameters of the layshaft 402, detailed above, are selected to provide an improved response to gear deflections of the planet gear 254 during operation while minimizing contact pressure on the roller bearing 285 and minimizing total weight of the layshaft 402. Thus, the embodiments detailed herein provide for a planet gear 254 that allows for a reduced axial length of the gearbox assembly 46, and, thus, a reduced axial length of the turbine engine 10. The overall weight of the turbine engine 10 is reduced and the engine efficiency is increased compared to turbine engines without the benefit of the present disclosure.

Further aspects are provided by the subject matter of the following clauses.

A gearbox assembly including a plurality of planet gears. At least one planet gear of the plurality of planet gears includes a layshaft that supports a first stage planet gear and a second stage planet gear. The at least one planet gear is characterized by a Radial Stage Distance greater than or equal to 30 millimeters and less than or equal to 100 millimeters, the Radial Stage Distance being $R_{rm1}-R_{rt2}$. $R_{rm1}$ is a first stage rim inner radius of the first stage planet gear and $R_{rt2}$ is a second stage root radius of the second stage planet gear.

The gearbox assembly of the preceding clause, the Radial Stage Distance being greater than or equal to 30 millimeters and less than or equal to 80 millimeters.

The gearbox assembly of any preceding clause, the Radial Stage Distance being greater than or equal to 40 millimeters and less than or equal to 80 millimeters.

The gearbox assembly of any preceding clause, $R_{rm1}$ being greater than or equal to 90 millimeters and less than or equal to 270 millimeters.

The gearbox assembly of any preceding clause, $R_{rm1}$ being greater than or equal to 90 millimeters and less than or equal to 200 millimeters.

The gearbox assembly of any preceding clause, $R_{rm1}$ being greater than or equal to 120 millimeters and less than or equal to 200 millimeters.

The gearbox assembly of any preceding clause, $R_{rt2}$ being greater than or equal to 60 millimeters and less than or equal to 170 millimeters.

The gearbox assembly of any preceding clause, $R_{rt2}$ being greater than or equal to 60 millimeters and less than or equal to 120 millimeters.

The gearbox assembly of any preceding clause, $R_{rt2}$ being greater than or equal to 80 millimeters and less than or equal to 120 millimeters.

The gearbox assembly of any preceding clause, the at least one planet gear including a rim that defines a rim thickness, the rim thickness being greater than or equal to 10 millimeters and less than or equal to 40 millimeters.

The gearbox assembly of any preceding clause, further including a roller bearing disposed within the at least one planet gear, the roller bearing having a roller bearing radius that is greater than or equal to 50 millimeters and less than or equal to 140 millimeters.

The gearbox assembly of any preceding clause, the gearbox assembly including a gear ratio greater than or equal to 7:1 and less than or equal to 12:1.

The gearbox assembly of any preceding clause, an axial length of the layshaft being greater than or equal to 150 millimeters and less than or equal to 300 millimeters.

The gearbox assembly of any preceding clause, an axial distance between the first stage planet gear and the second stage planet gear being greater than or equal to 1 millimeter and less than or equal to 6 millimeters.

The gearbox assembly of any preceding clause, the layshaft including an intermediate portion defining a generally Lambda shape.

The gearbox assembly of any preceding clause, the intermediate portion including an axial portion extending generally in an axial direction at an angle δ with respect to an axis of the at least one planet gear and a radial portion extending generally in a radial direction, the angle δ being greater than 0 degrees and less than or equal to 60 degrees.

The gearbox assembly of any preceding clause, the axial portion having an axial portion thickness that is greater than or equal to 3 millimeters and less than or equal to 10 millimeters.

The gearbox assembly of any preceding clause, the radial portion having a radial portion thickness that is greater than or equal to 2 millimeters and less than or equal to 10 millimeters.

The gearbox assembly of any preceding clause, a ratio of a radial force on the second stage planet gear to the rim thickness being greater than or equal to 3 kilonewtons per millimeter and less than or equal to 9 kilonewtons per millimeter.

The gearbox assembly of any preceding clause, a volume of the layshaft being greater than or equal to 3 cubic decimeters and less than or equal to 20 cubic decimeters.

The gearbox assembly of any preceding clause, further comprising a gear assembly coupled to an input shaft of a turbine engine and an output shaft of the turbine engine.

The gearbox assembly of any preceding clause, the input shaft being coupled to a core turbine engine of the turbine engine, and the output shaft being coupled to a fan of the turbine engine.

The gearbox assembly of any preceding clause, a torque being transferrable from the input shaft to the output shaft through the gear assembly.

The gearbox assembly of any preceding clause, a power rating of the turbine engine being greater than 7 megawatts.

A turbine engine including a core turbine engine coupled to an input shaft, a fan coupled to an output shaft, and a gearbox assembly. Torque is transferrable from the input shaft to the output shaft through the gearbox assembly. The gearbox assembly includes a plurality of planet gears. At least one planet gear of the plurality of planet gears includes a layshaft that supports a first stage planet gear and a second stage planet gear. The at least one planet gear is characterized by a Radial Stage Distance greater than or equal to 30 millimeters and less than or equal to 100 millimeters, the Radial Stage Distance being $R_{rm1}-R_{rt2}$. $R_{rm1}$ is a first stage rim inner radius of the first stage planet gear and $R_{rt2}$ is a second stage root radius of the second stage planet gear.

The turbine engine of the preceding clause, the Radial Stage Distance being greater than or equal to 30 millimeters and less than or equal to 80 millimeters.

The turbine engine of any preceding clause, the Radial Stage Distance being greater than or equal to 40 millimeters and less than or equal to 80 millimeters.

The turbine engine of any preceding clause, $R_{rm1}$ being greater than or equal to 90 millimeters and less than or equal to 270 millimeters.

The turbine engine of any preceding clause, $R_{rm1}$ being greater than or equal to 90 millimeters and less than or equal to 200 millimeters.

The turbine engine of any preceding clause, $R_{rm1}$ being greater than or equal to 120 millimeters and less than or equal to 200 millimeters.

The turbine engine of any preceding clause, $R_{rt2}$ being greater than or equal to 60 millimeters and less than or equal to 170 millimeters.

The turbine engine of any preceding clause, $R_{rt2}$ being greater than or equal to 60 millimeters and less than or equal to 120 millimeters.

The turbine engine of any preceding clause, $R_{rt2}$ being greater than or equal to 80 millimeters and less than or equal to 120 millimeters.

The turbine engine of any preceding clause, the at least one planet gear including a rim that defines a rim thickness, the rim thickness being greater than or equal to 10 millimeters and less than or equal to 40 millimeters.

The turbine engine of any preceding clause, a ratio of a radial force on the second stage planet gear to the rim thickness being greater than or equal to 3 kilonewtons per millimeter and less than or equal to 9 kilonewtons per millimeter.

The turbine engine of any preceding clause, further including a roller bearing disposed within the at least one planet gear, the roller bearing having a roller bearing radius that is greater than or equal to 50 millimeters and less than or equal to 140 millimeters.

The turbine engine of any preceding clause, the gearbox assembly including a gear ratio greater than or equal to 7:1 and less than or equal to 12:1.

The turbine engine of any preceding clause, an axial length of the layshaft being greater than or equal to 150 millimeters and less than or equal to 300 millimeters.

The turbine engine of any preceding clause, an axial distance between the first stage planet gear and the second stage planet gear being greater than or equal to 1 millimeter and less than or equal to 6 millimeters.

The turbine engine of any preceding clause, the layshaft including an intermediate portion defining a generally Lambda shape.

The turbine engine of any preceding clause, the intermediate portion including an axial portion extending generally in an axial direction at an angle δ with respect to an axis of the at least one planet gear and a radial portion extending generally in a radial direction, the angle δ being greater than 0 degrees and less than or equal to 60 degrees.

The turbine engine of any preceding clause, the axial portion including an axial portion thickness that is greater than or equal to 3 millimeters and less than or equal to 10 millimeters.

The turbine engine of any preceding clause, the radial portion including a radial portion thickness that is greater than or equal to 2 millimeters and less than or equal to 10 millimeters.

The turbine engine of any preceding clause, a volume of the layshaft being greater than or equal to 3 cubic decimeters and less than or equal to 20 cubic decimeters.

The turbine engine of any preceding clause, a power rating of the turbine engine being greater than 7 megawatts.

Although the foregoing description is directed to the preferred embodiments of the present disclosure, other variations and modifications will be apparent to those skilled in the art and may be made without departing from the spirit or the scope of the disclosure. Moreover, features described in connection with one embodiment of the present disclosure may be used in conjunction with other embodiments, even if not explicitly stated above.

The invention claimed is:

1. A gearbox assembly comprising:
a plurality of planet gears, at least one planet gear of the plurality of planet gears including a layshaft that supports a first stage planet gear and a second stage planet gear, the at least one planet gear being characterized by a Radial Stage Distance greater than or equal to 30 millimeters and less than or equal to 100 millimeters, the Radial Stage Distance being $R_{rm1}-R_{rt2}$, wherein $R_{rm1}$ is a first stage rim inner radius of the first stage planet gear and $R_{rt2}$ is a second stage root radius of the second stage planet gear.

2. The gearbox assembly of claim 1, wherein the Radial Stage Distance is greater than or equal to 30 millimeters and less than or equal to 80 millimeters.

3. The gearbox assembly of claim 1, wherein the Radial Stage Distance is greater than or equal to 40 millimeters and less than or equal to 80 millimeters.

4. The gearbox assembly of claim 1, wherein $R_{rm1}$ is greater than or equal to 90 millimeters and less than or equal to 270 millimeters.

5. The gearbox assembly of claim 1, wherein $R_{rm1}$ is greater than or equal to 90 millimeters and less than or equal to 200 millimeters.

6. The gearbox assembly of claim 1, wherein $R_{rm1}$ is greater than or equal to 120 millimeters and less than or equal to 200 millimeters.

7. The gearbox assembly of claim 1, wherein $R_{rm2}$ is greater than or equal to 60 millimeters and less than or equal to 170 millimeters.

8. The gearbox assembly of claim 1, wherein $R_{rt2}$ is greater than or equal to 60 millimeters and less than or equal to 120 millimeters.

9. The gearbox assembly of claim 1, wherein $R_{rt2}$ is greater than or equal to 80 millimeters and less than or equal to 120 millimeters.

10. The gearbox assembly of claim 1, wherein the at least one planet gear includes a rim that defines a rim thickness, the rim thickness being greater than or equal to 10 millimeters and less than or equal to 40 millimeters.

11. The gearbox assembly of claim 1, further including a roller bearing disposed within the at least one planet gear, the roller bearing having a roller bearing radius that is greater than or equal to 50 millimeters and less than or equal to 140 millimeters.

12. The gearbox assembly of claim 1, wherein the gearbox assembly includes a gear ratio greater than or equal to 7:1 and less than or equal to 12:1.

13. The gearbox assembly of claim 1, wherein an axial length of the layshaft is greater than or equal to 150 millimeters and less than or equal to 300 millimeters.

14. The gearbox assembly of claim 1, wherein an axial distance between the first stage planet gear and the second stage planet gear is greater than or equal to 1 millimeter and less than or equal to 6 millimeters.

15. The gearbox assembly of claim 1, wherein the layshaft includes an intermediate portion defining a Lambda shape.

16. The gearbox assembly of claim 15, wherein the intermediate portion includes an axial portion extending generally in an axial direction at an angle δ with respect to an axis of the at least one planet gear and a radial portion extending generally in a radial direction, the angle δ being greater than 0 degrees and less than or equal to 60 degrees.

17. The gearbox assembly of claim 16, wherein the axial portion has an axial portion thickness that is greater than or equal to 3 millimeters and less than or equal to 10 millimeters.

18. The gearbox assembly of claim 16, wherein the radial portion has a radial portion thickness that is greater than or equal to 2 millimeters and less than or equal to 10 millimeters.

19. A turbine engine comprising:
a core turbine engine coupled to an input shaft;
a fan coupled to an output shaft; and
a gearbox assembly, wherein a torque is transferrable from the input shaft to the output shaft through the gearbox assembly, the gearbox assembly comprising:
a plurality of planet gears, at least one planet gear of the plurality of planet gears including a layshaft that supports a first stage planet gear and a second stage planet gear, the at least one planet gear being characterized by a Radial Stage Distance greater than or equal to 30 millimeters and less than or equal to 100 millimeters, the Radial Stage Distance being $R_{rm1}-R_{rt2}$, wherein $R_{rm1}$ is a first stage rim inner radius of the first stage planet gear and $R_{rt2}$ is a second stage root radius of the second stage planet gear.

20. The turbine engine of claim 19, wherein the Radial Stage Distance is greater than or equal to 30 millimeters and less than or equal to 80 millimeters.

\* \* \* \* \*